United States Patent
Kirch et al.

(10) Patent No.: US 8,311,928 B2
(45) Date of Patent: Nov. 13, 2012

(54) FUEL OFFERING AND PURCHASE MANAGEMENT SYSTEM

(75) Inventors: Michael Kirch, New York, NY (US); Daniel Sharfman, New York, NY (US); Saurabh H. Sanghvi, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 473 days.

(21) Appl. No.: 11/733,191

(22) Filed: Apr. 9, 2007

(65) Prior Publication Data

US 2008/0249917 A1 Oct. 9, 2008

Related U.S. Application Data

(60) Provisional application No. 60/910,816, filed on Apr. 9, 2007.

(51) Int. Cl.
G06Q 40/00 (2012.01)
(52) U.S. Cl. .......................................................... 705/37
(58) Field of Classification Search ...................... 705/37
See application file for complete search history.

(56) References Cited

U.S. PATENT DOCUMENTS

| | | | | |
|---|---|---|---|---|
| 6,321,984 | B1 * | 11/2001 | McCall et al. ................ | 235/381 |
| 6,980,960 | B2 | 12/2005 | Hajdukiewicz | |
| 7,065,475 | B1 * | 6/2006 | Brundobler ..................... | 703/2 |
| 7,239,629 | B1 * | 7/2007 | Olshansky et al. ........... | 370/353 |
| 2001/0056382 | A1 * | 12/2001 | Asou ............................... | 705/26 |
| 2002/0013758 | A1 * | 1/2002 | Khaitan .......................... | 705/37 |
| 2002/0029171 | A1 * | 3/2002 | Senior ............................ | 705/26 |
| 2002/0052793 | A1 * | 5/2002 | Dines et al. ................... | 705/20 |
| 2002/0143616 | A1 | 10/2002 | Hajdukiewicz | |
| 2003/0033154 | A1 * | 2/2003 | Hajdukiewicz | |
| 2004/0177019 | A1 * | 9/2004 | Slavov et al. .................. | 705/36 |
| 2005/0240492 | A1 * | 10/2005 | Grdina ............................ | 705/26 |
| 2006/0293947 | A1 * | 12/2006 | Nicholson ...................... | 705/14 |
| 2007/0162372 | A1 | 7/2007 | Anas | |
| 2007/0198385 | A1 * | 8/2007 | McGill et al. ............... | 705/36 R |

(Continued)

OTHER PUBLICATIONS

Cingular 3G Coverage in More than 160 Markets, Modern Users News. Boyton Beach: Feb. 1, 2007. vol. 19, Iss 2.*

(Continued)

*Primary Examiner* — Jessica Lemieux
(74) *Attorney, Agent, or Firm* — Perkins Coie LLP

(57) ABSTRACT

The present disclosure is directed towards apparatuses, systems and methods to facilitate the pricing, sales and delivery of a commodity fuel to a Customer. In one embodiment, the disclosure teaches a Fuel Offer Generator that facilitates the purchase and management of fuel offerings. The Fuel Offer Generator allows Customers interested in securing fuel to obtain an offer for fuel at lock-in prices for various tenors. Fuel Customers can buy these fuel offers such that they may later exercise the fuel offers so their fuel costs are locked-in at desired levels (e.g., they may be set to strike prices). The Fuel Offer Generator also can establish a Premium Price that will be part of the fuel offer. The Fuel Offer Generator may generate hedges to counteract fuel related risks stemming from fuel offer purchases. Ultimately, a customer that purchases a fuel offering can exercise their fuel offering order at a specified price and redeem any difference between the market price for their purchased fuel and the price specified in their fuel offering order. While the Fuel Offer Generator may place various constraints on redemption, it will determine which metrics are relevant to pricing the fuel offering and then employ those determined metrics to establish the pricing of fuel offerings.

60 Claims, 29 Drawing Sheets

U.S. PATENT DOCUMENTS

| | | |
|---|---|---|
| 2007/0203793 A1 | 8/2007 | Hajdukiewicz |
| 2007/0203794 A1 | 8/2007 | Hajdukiewicz |
| 2008/0228509 A1 | 9/2008 | Weber |
| 2008/0313013 A1* | 12/2008 | Fell et al. ................... 705/10 |

OTHER PUBLICATIONS

PCT International Search Report/PCT Written Opinion dated Jan. 13, 2009.

* cited by examiner

FUEL OFFERING AND PURCHASE MANAGEMENT SYSTEM

RELATED APPLICATIONS

Applicants hereby claim priority under 35 U.S.C. §119 for U.S. provisional patent application No. 60/910,816 filed Apr. 9, 2007 and titled "FUEL OFFERING AND PURCHASE MANAGEMENT SYSTEM". The entire contents of the aforementioned application(s) are herein expressly incorporated by reference. This application is also related to co-pending U.S. Non-Provisional patent application Ser. No. 11/723,178 filed Apr. 9, 2007 and titled "FUEL OFFERING AND PURCHASE MANAGEMENT SYSTEM," co-pending U.S. Non-Provisional patent application Ser. No. 11/723,192 filed Apr. 9, 2007 and titled "FUEL OFFERING AND PURCHASE MANAGEMENT SYSTEM," co-pending U.S. Non-Provisional patent application Ser. No. 11/733,193 filed Apr. 9, 2007 and titled "FUEL OFFERING AND PURCHASE MANAGEMENT SYSTEM," co-pending U.S. Non-Provisional patent application Ser. No. 11/733,199 filed Apr. 9, 2007 and titled "FUEL OFFERING AND PURCHASE MANAGEMENT SYSTEM," co-pending U.S. Non-Provisional patent application Ser. No. 11/722,198 filed Apr. 9, 2007 and titled "FUEL OFFERING AND PURCHASE MANAGEMENT SYSTEM," co-pending U.S. Non-Provisional patent application Ser. No. 11/733,197 filed Apr. 9, 2007 and titled "FUEL OFFERING AND PURCHASE MANAGEMENT SYSTEM," and co-pending U.S. Non-Provisional patent application Ser. No. 11/723,200 filed Apr. 9, 2007 and titled "FUEL OFFERING AND PURCHASE MANAGEMENT SYSTEM".

FIELD

The disclosure relates generally to commodity management systems and more particularly to apparatuses, systems and methods for facilitating the pricing, sales and delivery of a commodity or a commodity derivative to a customer.

BACKGROUND

The generally increasing and unpredictably fluctuating costs of vehicle fuels, for example automobile fuels, have impacted both private consumers and commercial businesses. Not only have fuel prices risen steadily over the long term at rates that significantly exceed the general cost of living, but fuel prices also suffer significant short-term fluctuations due both to predictable and unpredictable market forces.

Long-term, steady increases in fuel prices result from a variety of influencing factors, including growing depletion of fossil fuels, increasing costs associated with locating and developing raw fuel materials, increasing pricing demands made by oil-producing countries, and others as will be known to the reader.

Short-term price fluctuations in fuel prices can result from both predictable and unpredictable events. Summer travel is an example of a predictable market demand event that typically causes the price of vehicle fuel to fluctuate upwards at a time when the increased cost has the most significant effect on a typical purchaser. National and international conflicts and political unrests in and amongst oil-producing countries are examples of unpredictable events that often produce unexpected and volatile increases in crude and hence processed fuel products.

These price fluctuations have significantly impacted many purchasers. Automobile drivers find the cost of fuel prohibitive for both business commuting and optional travel. Airlines have been forced to significantly increase the cost of air transportation to accommodate rising fuel prices. Service providers dependent on fuel prices, for example taxis, trucking services, package delivery services and others have all been forced to increase prices to accommodate rising fuel prices.

Many consumers and commercial fuel users have taken significant steps to control or diminish their fuel consumption. More fuel-efficient vehicles have become available and put into use. Unnecessary travel or fuel usage may be curtailed. Carpooling and the use of public transportation have increased. These "green," environmentally friendly efforts may result in lower fuel usage and hence lower fuel costs. However, they do not protect against the ongoing, steady, long-term rise in fuel costs. Neither do they offer significant help against unpredictable, short-term fuel price fluctuations.

In general, it is quite difficult if not impossible for parties dependent on fuel costs to plan and budget accurately and appropriately for the ever-changing price of fuel, particularly vehicle fuel. Some parties have engaged in pre-purchase programs of automotive fuel, which is stored at specified filling stations for subsequent pick-up and use by the parties. Such action require purchase and storage of the fuel, and require the parties to pick up the fuel from the storage location. For large, sophisticated commercial practitioners, hedging is another method of controlling the future cost of a commodity.

SUMMARY

The present disclosure is directed towards apparatuses, systems and methods to facilitate the pricing, sales and delivery of a commodity fuel to a Customer. In one embodiment, the disclosure teaches a Fuel Offer Generator that facilitates the purchase and management of fuel offerings. The Fuel Offer Generator allows Customers interested in securing fuel to obtain an offer for fuel at lock-in prices for various tenors. Fuel Customers can buy these fuel offers such that they may later exercise the fuel offers so their fuel costs are locked-in at desired levels (e.g., they may be set to strike prices). The Fuel Offer Generator also can establish a Premium Price that will be part of the fuel offer. The Fuel Offer Generator may generate hedges to counteract fuel related risks stemming from fuel offer purchases. Ultimately, a customer that purchases a fuel offering can exercise their fuel offering order at a specified price and redeem any difference between the market price for their purchased fuel and the price specified in their fuel offering order. While the Fuel Offer Generator may place various constraints on redemption, it will determine which metrics are relevant to pricing the fuel offering and then employ those determined metrics to establish the pricing of fuel offerings.

In one embodiment, a method is disclosed for providing fuel offerings, the method comprising: setting at least one commodity offering terms for a commodity offering; setting at least one commodity offering exercise restrictions for a commodity offering; determining at least one commodity offering pricing value based on the at least one commodity offering terms and at least one commodity offering pricing model for the commodity offering; providing the commodity offering, including at least one association based on the commodity offering pricing values between a strike price and a premium, for selection by a customer; and providing payment for some portion of a commodity purchase for an exercised commodity offering subject to the at least one commodity offering exercise restrictions, wherein the strike price of the commodity offering is less than a geographically averaged commodity price.

BRIEF DESCRIPTION OF THE DRAWINGS

The accompanying appendices and/or drawings illustrate various non-limiting, example, inventive aspects in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Fuel Offering Generator

Figure 1A:
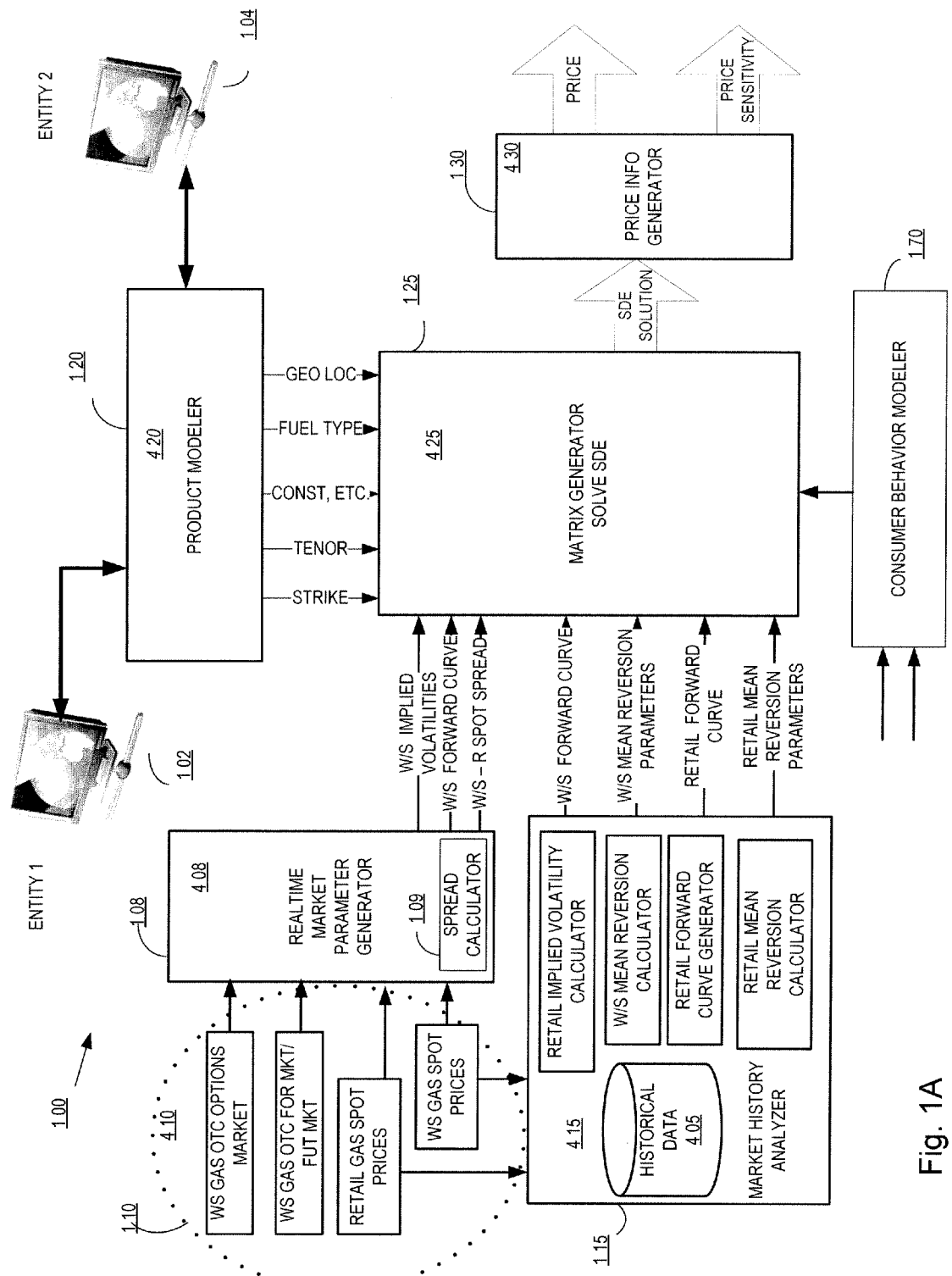
FIGS. 1A-B illustrate aspects of an embodiment of the Fuel Offering Generator.

FIG. 1A illustrates a system 100 for generating fuel offerings according to an embodiment of the Fuel Offering Generator. System 100 comprises a market parameter generator 408 coupled for real-time monitoring of data related to a fuel market 410. Real-time market data refers to data reflecting current market conditions as trading in the market takes place. Examples of real-time market data provided to real-time market parameter generator 108 include wholesale over-the-counter fuel options market data, wholesale fuel options over-the-counter forward market and futures market data, and spot prices for retail fuel as well as spot prices for wholesale fuel. In an alternative embodiment, a market parameter generator may be configured to periodically and/or intermittently query current values for market parameters.

A market history analyzer 115 is coupled to receive and/or record observable real-time market data and/or historical records of market data related to market 110. The market history analyzer may record and store observed market data and/or historical market data accumulated historically and received by the market history analyzer. In that manner, market history analyzer 115 develops data related to the historical performance of the market. In one embodiment of the Fuel Offering Generator, market data includes retail gas spot prices and wholesale gas spot prices.

A product matrix generator 125 is coupled to the market parameter generator 108 and to the market history analyzer 115. Product matrix generator 125 is configured to the behavior of market 110. Product matrix generator 125 operates on the parameters it receives from real-time market parameter generator 108 and market history analyzer 115 in accordance with a stochastic model of the dynamics of the market 110. In one implementation, the product matrix generator 125 may consider some of the market variables and/or other input parameters in FIG. 4A and discussed below. Product matrix generator 125 may solve a stochastic differential equation to provide a commodity volatility model based on the input parameters.

In one embodiment, the matrix generator 125 is configured to solve stochastic differential equations for market models using parameters provided by real-time market parameter generator 108 and market history analyzer 115. Among other parameters provided by real-time market parameter generator 108 and market history analyzer 115, parameters reflecting retail fuel sales activity may be collected and provided to real-time market parameter generator 108 and market history analyzer 115 in embodiments of the Fuel Offering Generator.

For example, in one embodiment of the Fuel Offering Generator, the matrix generator 125 is configured to process spot price spread information provided by real-time market parameter generator 108. The spot price spread information is related to a difference between a retail fuel spot price and a wholesale fuel spot price. Matrix generator 125 processes the spot price spread information in accordance with a stochastic model. In embodiments of the Fuel Offering Generator, the matrix generator 125 is further configured to process retail fuel forward curve parameters in accordance with a stochastic model. The retail forward curve parameters may be provided by the market history analyzer 115. In another embodiment of the Fuel Offering Generator, the matrix generator 125 may further solve alternative market models that are adapted and/or deemed suitable for use in embodiments of the Fuel Offering Generator.

In one embodiment of the Fuel Offering Generator, the matrix generator 125 receives market parameters from real-time market parameter generator 108 and from market history analyzer 115. Product matrix generator 125 processes and analyzes the information to provide a solution for the adapted stochastic differential equation. Product matrix generator 125 may be coupled to price information generator 130 and configured to provide the solution thereto. Based upon the solution it receives from product matrix generator 125, price information generator 130 may provide data representing a product price at an output in one implementation. In an embodiment of the Fuel Offering Generator, the price information generator 130 may also provide data representing price sensitivity at an output. In one implementation, the price sensitivity may indicate price sensitivity not only with respect to wholesale fuel markets but also with respect to retail fuel prices, and/or with respect to other input variables received from real-time market parameter generator 408, market history analyzer 405, and/or product modeler 420.

In one embodiment, the system 100 further comprises a product modeler 120. Product modeler 120 is coupled to at least one computer system 102. In some embodiments of the Fuel Offering Generator, the product modeler 120 is coupled to two computer systems 102 and 104. In embodiments of the Fuel Offering Generator at least one of computer systems 102 and 104 comprises a fuel offering Purchaser computer. In some embodiments the fuel offering Purchaser computer may be coupled to product modeler 120 via a communications network, such as the Internet. A fuel purchaser may enter information related to a fuel product, such as a fuel offering, using the fuel offering Purchaser computer. The fuel offering Purchaser computer transmits the information to product modeler 120. In one implementation, the product modeler 120 may use the information from the fuel offering Purchaser to determine features of a financial product to be modeled by product modeler 120.

In one embodiment, the Fuel Offering Generator 100 comprises at least one Distributor computer system 104. Distributor computer system 104 is coupled to product modeler 120 and may enable a Distributor to define characteristics of a financial product comprising fuel offerings to be offered to a consumer. In that embodiment a Distributor inputs data to Distributor computer 104. Distributor computer 104 provides the data to product modeler 120. Product modeler 120 models the financial product in accordance with the characteristics provided by Distributor computer system 104.

Product modeler 120 is coupled to product matrix generator 125. Based upon inputs from at least one of a fuel purchaser computer 102 and a Distributor computer 104 product modeler 120 generates data representing features of a financial product. System 100 determines the price of the financial product based upon product data provided by product modeler 120, real-time market parameters provided by real-time market parameter generator and on historical market data provided by market history analyzer 115.

In one embodiment of the Fuel Offering Generator, the matrix generator 125 is coupled to a consumer behavior modeler 170. Consumer behavior modeler 170 receives data representing Purchaser (e.g., consumer) behavior with respect to fuel offering execution and/or purchase, ownership, exercising, and/or the like. Based upon the behavior data consumer behavior modeler 170 provides Purchaser and/or consumer behavior parameters to matrix generator 125. In that embodiment, matrix generator 125 considers the Purchaser and/or consumer behavior in calculating price for a financial product.

Figure 1B:
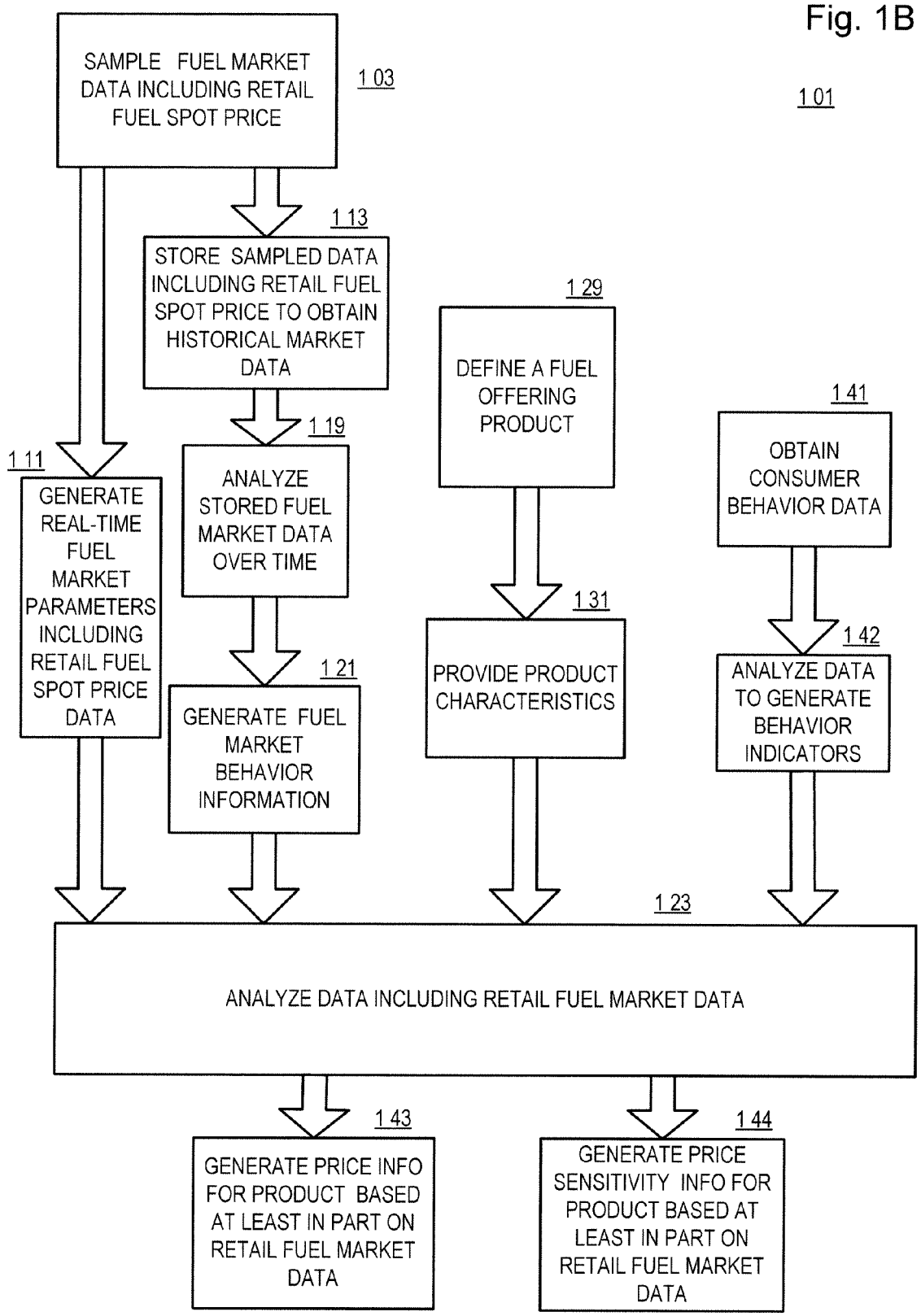

FIG. 1B describes one embodiment of a Fuel Offering Generator 101. In one implementation of the Fuel Offering Generator, a fuel offering comprises a product related to future purchases of fuel in a retail fuel market. Both the retail and the wholesale fuel markets are observed 103. Observable wholesale fuel market parameters include wholesale fuel over-the-counter (OTC) options information, wholesale gas over-the-counter (OTC) forward market data in a wholesale fuel market. Fuel market data including retail fuel spot price information is obtained 103.

Market parameters related to current market conditions are generated based on the observed fuel market condition 111. At least one generated market parameter related to current market conditions is wholesale-retail spot price spread in one implementation. Other generated market parameters may include a wholesale implied volatility and a wholesale forward curve.

In one embodiment of the invention parameters related to current market conditions are sampled and stored to provide historical data describing past market behavior 113. One sampled and stored parameter used in one implementation to provide historical data is retail fuel market spot price. Thus historical data related to retail fuel spot price is acquired.

Historical data, such as data related to retail fuel spot price, may be analyzed 119. The analysis may, in one implementation, consider retail fuel market information. The data is used to estimate parameters of models for fuel market behavior 121. Examples of generated fuel market behavior parameters may include retail implied volatility, wholesale mean reversion, retail forward curve and retail mean reversion. The indicators of fuel market behavior and the parameters related to current market conditions are analyzed 123. In one embodiment of the Fuel Offering Generator, the analyzing step is carried out by stochastic modeling. Price information for the fuel offering is generated 143. In one embodiment of the Fuel Offering Generator, price sensitivity information related to the fuel offering is generated 144.

In further embodiments of the invention Purchaser and/or consumer behavior may be observed 141. Data related to Purchaser and/or consumer behavior is obtained based on the observations. In one embodiment of the invention Purchaser and/or consumer behavior data is analyzed 142 as considered in an analyzing step 123 as a factor in generating price information 143.

Fuel Offering Generator Information Flow

Figure 2:
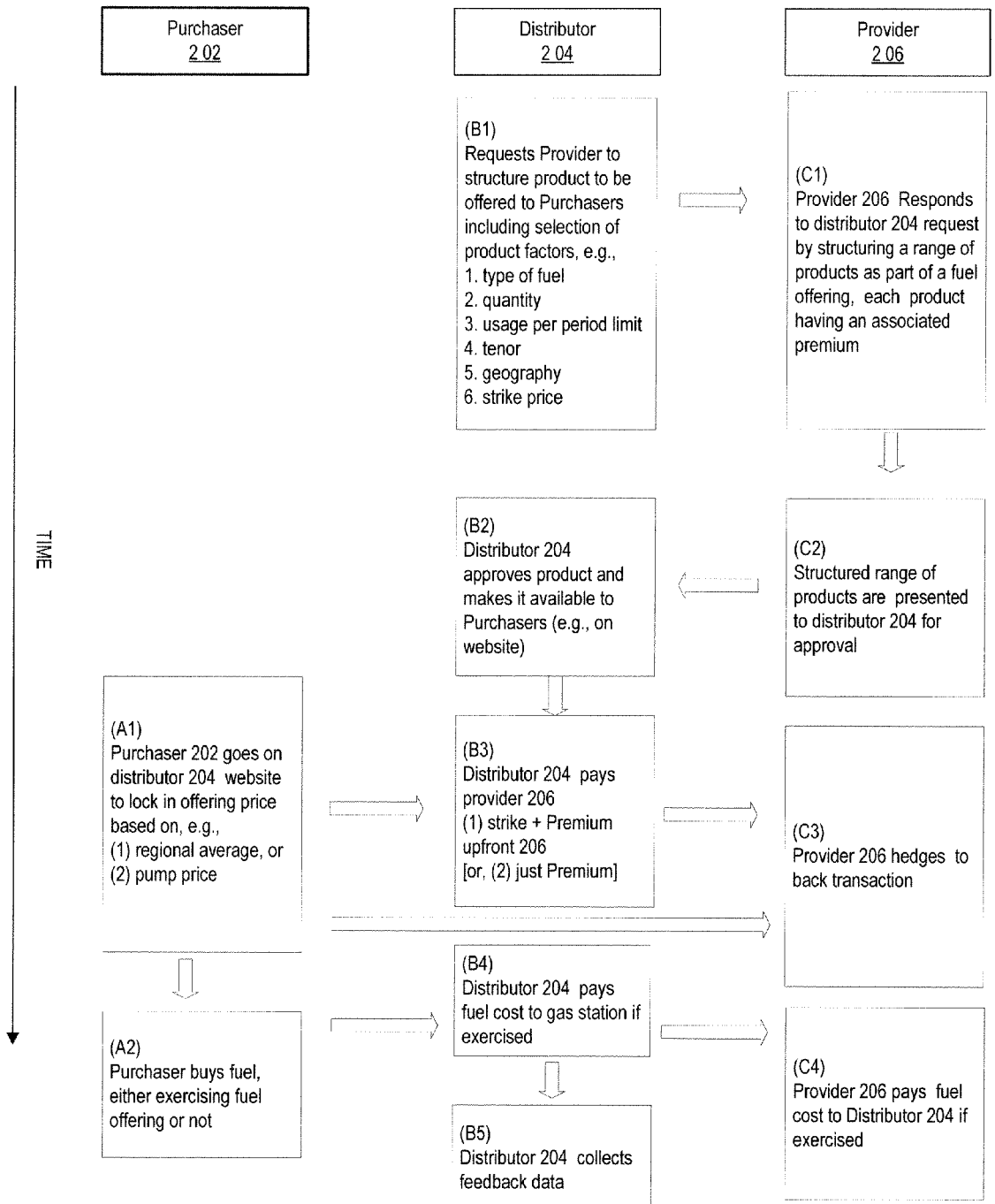
FIG. 2 shows a top level information flow of a process for creating and managing the execution of fuel offerings to one or more Purchasers, according to one embodiment.

With reference now to FIG. 2, there are shown and described a top level information flow of a process for creating and managing the execution of fuel offerings to one or more Purchasers, according to one embodiment.

FIG. 2 is seen to include three principal parties including a Provider 202 of fuel offerings, a Distributor 204 of fuel offerings and at least one Purchaser 206 of fuel offerings. It will be understood that in certain embodiments, the Provider 202 and Distributor 204 may be considered as a single entity from the perspective of the Purchaser 206. It will also be understood that while FIG. 2 illustrates a single Purchaser 206, for ease of explanation, the single Purchaser 206 is representative of a marketplace of potential Purchasers 206 of the fuel offering.

At block B1, a request is made by the Distributor 204, directed to the Provider 202, to structure and/or generate one or more fuel offerings. In some embodiments, the request may include some number of product factors and/or parameters, for example, (i) the type of fuel to offered, (ii) the quantity of fuel to be offered, (iii) usage per period limitations, (iv) tenor, (v) geography, and/or (vi) strike price. Of course, in other embodiments, other combinations and/or additional factors and/or parameters may alternatively or additionally be provided.

At block C1, the Provider 206 structures a selection of fuel offerings, responsive to the Distributor 204 request. The selection of fuel offerings may, in one embodiment, include associated premiums based on the parameters provided by the Distributor 204. In certain embodiments, the selection of fuel offerings may constitute a single fuel offering or a range of fuel offerings, as shown in Table 1 below. Depending on the embodiment, a fuel offering may be characterized its type (e.g., fuel type, such as regular unleaded gasoline, premium unleaded gasoline, diesel, bio-diesel, ethanol, hydrogen and/or the like), strike price, tenor or term (e.g., 3 months, 6 months, 1 year, etc.), calculated premium and/or the like. Table I, illustrates, by way of non-limiting example, an exemplary range of fuel offerings which may be constructed by the Provider 206, responsive to a Distributor 204 request.

TABLE 1

| Type | Quantity | Strike Price | Tenor | Premium |
| --- | --- | --- | --- | --- |
| Diesel | 30k gallons | $2.50 | 3 months | $0.40 |
| Diesel | 30k gallons | $2.75 | 3 months | $0.30 |
| Diesel | 30k gallons | $3.00 | 3 months | $0.20 |
| Diesel | 30k gallons | $3.25 | 3 months | $0.10 |

With continued reference to FIG. 2, at block C2, the range of fuel offerings, such as those shown in Table 1, are presented to the Distributor 204 for his or her approval and/or selection.

At block B2, the Distributor 204, may select one or more fuel offerings and make said offering(s) available to Purchasers 202. In one embodiment, it is contemplated that the fuel offering(s) may be made widely available over to a large population of potential Purchasers over an electronic network, such as the Internet. In the case where the Distributor 204 does not select one or more fuel offerings, the process may return to block C1 and the fuel offerings may be restructured in an appropriate manner.

At block B3, the Distributor 204 may pay the Provider 206 an upfront strike price plus premium and/or service markup, or otherwise paying only a premium and/or service markup.

At block C3, the Provider 206 may protect its fuel offering investment by employing hedging strategies, such as, for example, utilizing forward contracts, futures, wholesale fuel options and/or the like in appropriate combination(s). In some embodiments, the Provider 206 may alternatively elect not to employ any hedging strategies.

At block A1, a Purchaser 202 may access the Distributor 204 (e.g., via a web-site) to purchase one or more fuel offerings being marketed by the Distributor 204. For example, with reference again to Table I, a Purchaser 202 may elect to purchase the first listed fuel offering (see row 1 of Table I),

| Type | Quantity | Strike Price | Tenor | Premium |
| --- | --- | --- | --- | --- |
| Diesel | 30k gallons | $2.50 | 3 months | $0.40 |

At block A2, the Purchaser 202, in possession of the fuel offering shown above, may exercise the fuel offering to purchase fuel (in this case, diesel fuel) up to the stipulated quantity, during the indicated tenor, and at the indicated strike price. Additional details of the transaction may be dependent upon the model being utilized by the Distributor 204 (e.g., based on a national average price or a pump price). For example, in some embodiments, when a Purchaser 202 purchases fuel, the Distributor 204 may pay the difference between the strike price ($2.50), and either the pump price at the point of purchase or a national average price on the date of purchase. In one embodiment, the fuel offering is priced to include the strike price plus the premium, so that upon exercising the fuel offering (i.e., buying gas), the Purchaser 202 pays out no money, and the fuel retailer is paid by the Distributor 204. As a further example, in accordance with one implementation of the pump price model, if the pump price is $3.00 and the fuel offering strike price is $2.50, the Purchaser 202 effectively pays $0.10 less than the pump price, considering a premium payment of $0.40, which is advantageous to the Purchaser 202.

At block B4, in response to the Purchaser 202 purchasing fuel at block A2 within the construct of the fuel offering, the Distributor 204 pays the fuel retailer (e.g., gas station) at the point of purchase the cost of the gasoline based on the pump price on the date of purchase. In an alternative embodiment wherein the Purchaser has only paid a premium and not a strike price to the Distributor up front, the Distributor may only pay based on the difference between the pump price and the fuel offering strike price to the gas station.

At block B5, the Distributor collects feedback data on each fuel offering exercise and/or purchase, such as the one described at block A2 and said data is provided to the Provider 206 to enable refinement of future fuel offerings. The collected data may include the prices at which Purchasers are exercising fuel offerings (e.g., purchasing fuel) relative to the corresponding fuel offerings strike prices, the quantities involved and/or other indicia.

At block C4, the Provider pays the Distributor the cost of the gasoline for which the Distributor has paid the gas station. In an alternative embodiment, the Provider may only pay the difference between the cost of the gasoline and the cost calculated based on the fuel offering strike price.

Financial Structure Model

Figure 3A:
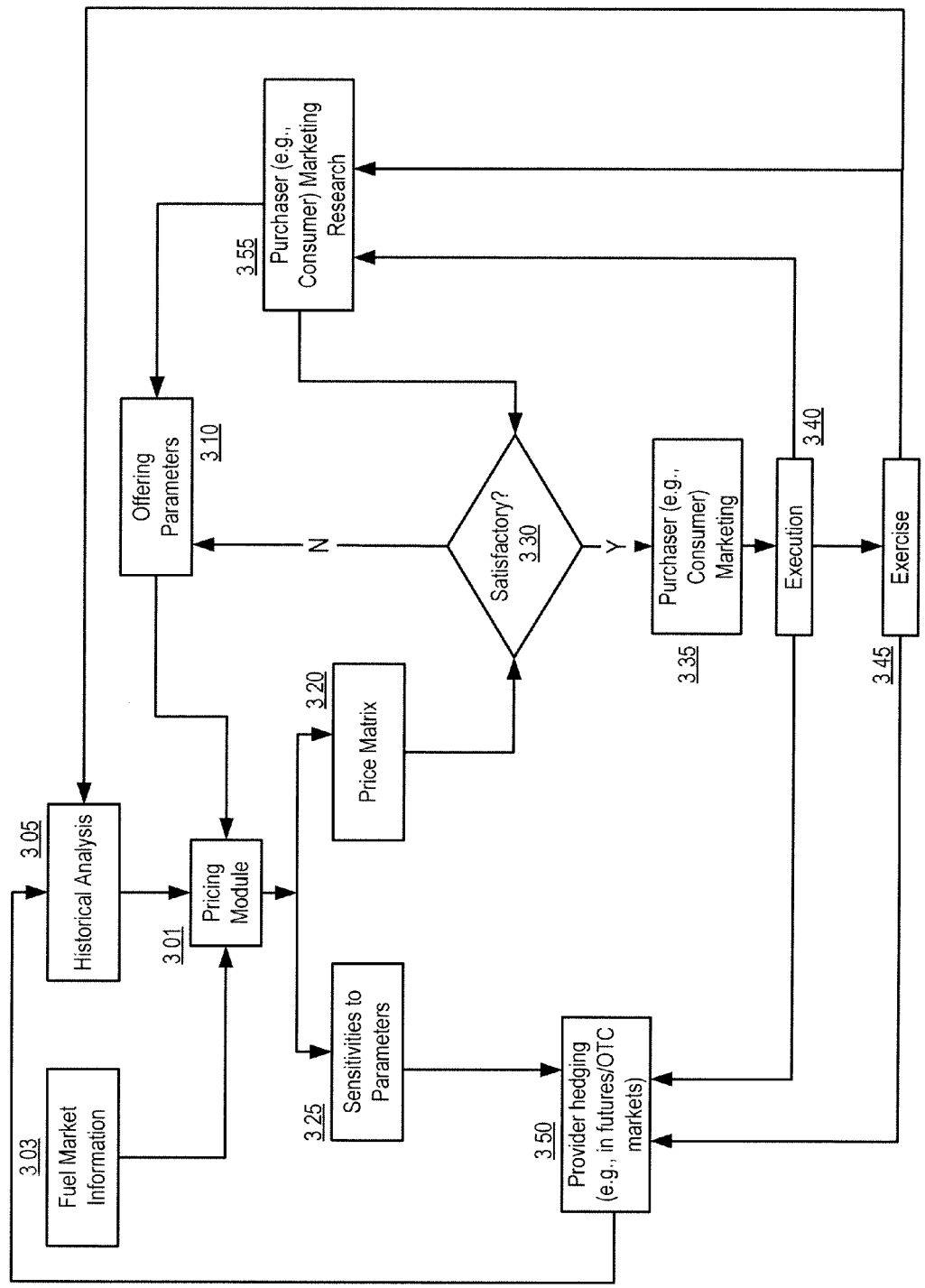
FIGS. 3A-B are of aspects of financial structure model operation in particular embodiments of Fuel Offering Generator operation.
Figure 3B:
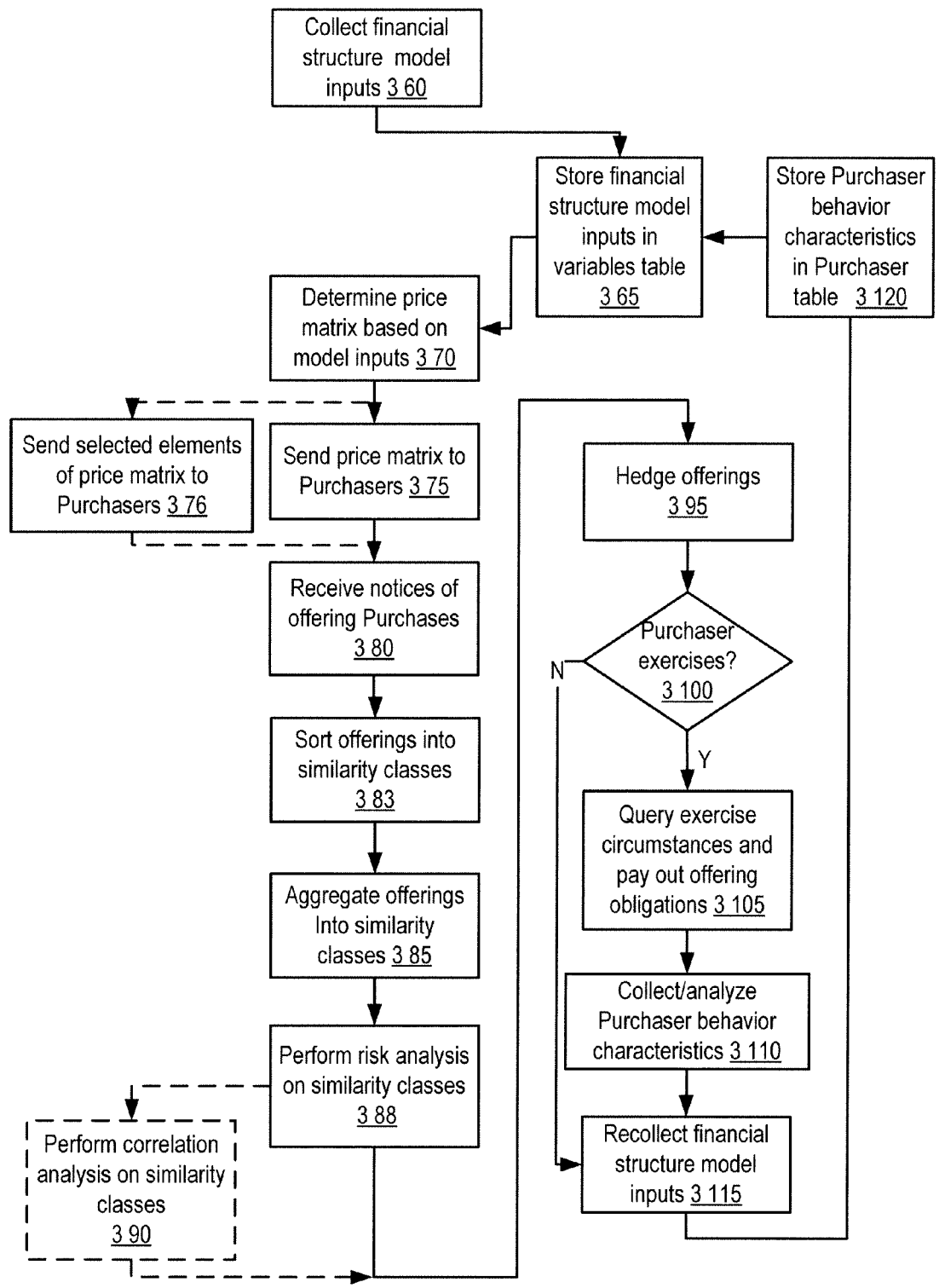

FIGS. 3A-B show aspects of financial structure model operation in particular embodiments of Fuel Offering Generator operation. In FIG. 3A, a combined logic and data flow diagram is shown illustrating one implementation of the financial structure model. A pricing module 301 receives as inputs fuel market information 303, historical analysis 305, and offering parameters 310. Details surrounding the nature of these inputs, including examples thereof, and of pricing module operation, will be discussed in greater detail in the context of offering pricing below. The pricing module yields as output at least one offering price and/or price matrix 320, that may be comprised of one or more offerings with associated strike price, premium, tenor, terms, service markup, restrictions, constraints, discounts, and/or the like. The pricing module may also yield as output at least one set of sensitivity data characterizing the sensitivity of price matrix elements to input parameters. For example, the sensitivity data may delineate, among other things, the sensitivity of the premium of a given offering or set of offerings to fuel market factors, such as retail gasoline spot prices. Sensitivity may be represented, in one implementation, by the first derivative of the output variable (e.g., offering price, premium, strike price, etc.) with respect to an input variable (e.g., market factors, historical factors, offering parameters).

The Provider determines at 330 whether the price matrix 320 is satisfactory based on a set of price matrix satisfaction criteria, which may include a consideration of the reasonableness of premium value and strike price combinations. Price matrix satisfaction criteria may also be based in part on accumulated Purchaser (e.g., consumer) marketing research data 333, such as data describing which offerings, premium and strike price combinations, etc. are most attractive to Purchasers, which types of offerings are least likely to be exercised, and/or the like. If the price matrix 320 output by the pricing module 301 is not satisfactory based on the satisfaction criteria, then the offering parameters 310 may be adjusted in order to improve the alignment of the pricing matrix with the satisfaction criteria in the next iteration. If, on the other hand, the pricing matrix does meet a minimum standard of satisfaction, then the corresponding offerings are made available in a Purchaser market, such as a consumer market 335. Purchasers may execute purchases of offerings 340 and, subsequently, exercise the offerings 345 to receive pay-outs consistent with offering terms.

In one implementation, the Provider itself may price offerings, make them available to a Purchaser market, execute Purchaser offering purchases, and honor Purchaser offering exercises. In another implementation, the Provider may price offerings and make them available to an intermediary Distributor entity, who may provide them to a Purchaser market and interface with Purchasers for offer purchases and exercises. Additional details surrounding Provider-Distributor-Purchaser interactions in the context of offering exercise delays are discussed below.

Data related to offering executions and exercises (e.g., offering popularity, exercise rates, and/or the like) may be monitored by the Provider and incorporated into a Purchaser marketing research data set that may be sampled in subsequent selection of offering parameters. For example, the Provider may observe that all 3-month tenor, regular octane gasoline offerings having a strike price of $2.90/gallon and up sell considerably more poorly than other offerings regardless of the premium charged. Subsequent offering generations may, consequently, exclude these offering parameters and/or terms altogether. Offering exercise information may also be fed back into the pricing module through historical analysis variables that may alter the strike price and/or premium of particular offering rather than changing the presence or absence of offering parameters altogether. For example, the Provider may observe that the profits derived from 12-month tenor, regular octane gasoline offerings having a strike price of $2.00/gallon are greater than expected because Purchasers who exercise these particular offerings tend to behave sub-optimally. Consequently, the system may incorporate that knowledge to charge a lower premium for these particular offerings that may attract more Purchasers to these types of offerings and potentially increase the profits derived from them even more.

Data related to execution 340 and exercise 345 of offerings may also be incorporated, along with sensitivity data 325, into Provider hedging strategies and/or practices 350. In an effort to offset, mitigate, and/or eliminate some amount of risk associated with the sale of offerings, the Provider may elect to select, purchase, and/or manage a portfolio of hedging instruments. A Provider devised hedging portfolio may be comprised of a variety of different types of holdings in various implementations that may include but are not limited to equities, debts, derivatives, synthetics, notes, stocks, preferred shares, bonds, debentures, options, futures, swaps, rights, warrants, commodities, currencies, long and/or short positions, ETFs, and/or other assets or investment interests. In one implementation, a Provider devised hedging portfolio may be comprised of forward contracts and/or futures of exchange or over-the-counter (OTC) traded wholesale fuel options, gasoline options, and/or the like. Sensitivity data 325 provides information describing the degree to which a particular input variable (e.g., a market parameter) affects the strike price and/or premium of an offering. Counteracting the risk associated with an offering may, therefore, be accomplished by seeking instruments whose sensitivity to input variables is similar in magnitude but opposite in direction to offering sensitivities. Observed offering execution and exercise practices and/or trends of Purchasers may further affect Provider hedging strategies and/or practices. For example, an observation of sub-optimal exercise of offerings by Purchasers may indicate to a Provider that a smaller purchase of hedging instruments will suffice to offset the risk associated with the offerings. In the extreme case, wherein the offerings are never exercised under any circumstances, the Provider would have no need for hedging instruments at all. Further details surrounding hedging strategies and/or practices in the context of Purchaser aggregation and scale are discussed below.

FIG. 3B shows logic flow in an implementation of the financial structure model in one embodiment of Fuel Offering Generator operation. A Provider collects financial structure model inputs 360, such as market factors, average and/or specific fuel prices, price and/or market factor geographic distributions, historical price data and/or market factors, offering parameters (e.g., strike price, premium, tenor, restrictions, discounts, incentives, and/or the like), Purchaser and/or consumer behavior considerations, hedging strategy considerations, and/or the like and stores them in a variables table at 365. Based at least in part on financial structure model inputs, the Provider may determine a price matrix 370. Model inputs, outputs, and price matrix determination logic will be discussed in greater detail below. In one implementation, a price matrix may be comprised of a collection of offerings with varying terms, strike prices, premiums, incentives, restrictions, and/or the like. In one implementation, the Provider and/or the Distributor may further append a service markup to the strike price and/or premium to yield an offering price and/or collection of offering prices within a consumer price matrix.

The Provider may send 375 a price matrix, consumer price matrix, and/or some portion thereof 376 to Purchasers for consideration and, for any Purchasers who request to purchase offerings, the Provider may subsequently receive notices of offering purchases 380 and execute offerings. These executed offerings may be sorted 383 and subsequently aggregated 385 into a plurality of similarity classes based on some desired criteria, such as Purchaser location, selected offering parameters and/or terms, Purchaser characteristics and/or demographics, Purchaser behavior and/or history, and/or the like. A sensitivity and/or risk analysis 388 may be performed on the similarity classes in order to determine sensitivity of offering prices to various input parameters (such as described above) and risk characteristics that may be considered in a hedging strategy for subsequent hedging of Provider risks and/or obligations. In addition, the Provider may optionally perform correlation analysis 390 on similarity classes, similarity class sensitivities, and/or similarity class risks in order to determine which, if any, similarity classes exhibit similar sensitivity and/or risk characteristics and/or correlations. Similarity classes with correlated sensitivity and/or risk behaviors may then be aggregated to simplify and/or expedite Provider hedging strategies.

The Provider may subsequently implement hedging strategies and/or accumulate a hedging portfolio 395. In one implementation, Provider hedging strategies may be based in part on execution of Purchaser offering purchases, Purchaser offering exercises, and/or other Purchaser behaviors (e.g., Purchaser irrationality, and/or the like) at different scales of Purchaser granularity. In one implementation, Provider hedging strategies may be based in part on individual Purchaser offering purchases and/or exercises. For example, a large institutional Purchaser (e.g., a trucking company) may purchase a large enough offering and/or quantity of smaller offerings to motivate a Provider to develop a hedge strategy based solely on the single Purchaser purchase and/or behavior. In another implementation, Provider hedging strategies may be based in part on aggregated Purchaser offering purchases and/or exercises. For example, in this implementation, a Purchaser's offering purchase of a small quantity of gasoline may not affect the Provider's hedging strategy and/or portfolio. Instead, the Provider may enter a record of the offering purchase into a purchase repository for temporary storage and/or aggregation with other fuel offerings. The Provider may then periodically analyze purchase repository contents in order to determine when there is an aggregation of Purchaser offering purchases that is sufficiently large and/or significant to warrant consideration in the Provider hedging strategy and/or modification of the Provider devised hedging portfolio. Aggregation of Purchaser offering purchases may be made in a variety of different ways within various implementations. In one implementation, Purchaser offering purchases may be aggregated based on time of purchase. In another implementation, Purchaser offering purchases may be aggregated based on Purchaser characteristics (e.g., demographics, location, Purchaser behavior profile, and/or the like). In another implementation, Purchaser offering purchases may be aggregated based on the nature of Purchasers (e.g., individual Purchasers, small business Purchasers, large business Purchasers, government/institutional Purchasers, and/or the like). In another implementation, Purchaser offering purchases may be aggregated based on the risk characteristics associated with Purchasers and/or Purchaser characteristics. In addition to storing execution of Purchaser offering purchases for aggregation, a Provider may additionally or alternatively store exercise of Purchaser offerings for aggregation and subsequent consideration in hedging strategies.

The Provider may monitor and/or track Purchaser offerings to determine if offerings are exercised 3100. If a Purchaser has exercised a purchased offering, then the Provider may query the circumstances of the Purchase exercise and pay-out the Provider's obligation under the terms of the offering in light of those circumstances 3105. Circumstances may include location, time, fuel price (e.g., the average price of gasoline in a region wherein the offering was exercised, a regional or national average fuel price, and/or the like), status of Purchaser owned offering and/or offering restrictions at the time of purchase (e.g., whether the Purchaser has exceeded a monthly cap, whether the Purchaser is in a restricted region, and/or the like), and/or the like. In one implementation, the Provider may determine the Purchaser owned offering's strike price and a reference fuel price at the time of offering exercise and, if the strike price is less than the reference fuel price, determine the difference between those prices, multiply that difference by the volume of gas on which the offering is being exercised, and implement any additional discounts, penalties, or restrictions in order to determine the payout amount. In one implementation, the reference fuel price is a regional average fuel price. In another implementation, the reference fuel price is a national average fuel price. The Provider may also collect and/or analyze Purchaser behavior characteristics 3110. The Provider may recollect and/or update financial structure model inputs at 3115. The Provider may also store collected and/or analyzed Purchaser behavior characteristics in a Purchaser table 3120.

In alternative implementations, a Provider may interface with Purchasers through an intermediary Distributor entity. In such an implementation, the Provider at 375 and/or 376 may send a pricing matrix or portion thereof to the Distributor, who may then optionally select elements of the price matrix and/or add a service markup to create a consumer price matrix for subsequent presentation to Purchasers. Purchasers who wish to purchase offerings may request offerings from the Distributor and offer payment based on the corresponding entries in the consumer price matrix. The Distributor, in turn, may relay purchase requests to the Provider 380 and/or purchase offerings from the Provider, and relay those offerings back to the Purchasers. When a Purchaser exercises an offering 3100, the Distributor may pay-out to the Purchaser to regain ownership of the offering and immediately submit an exercise notice to the Provider to receive pay-out therefrom. Alternatively, a Distributor may pay-out obligations to Purchasers when offerings are exercised by those Purchasers, retake ownership of those offerings, and yet retain ownership until some later time at which an exercise notice is submitted to the Provider. Such a delay may allow the Distributor to take advantage of subsequent market changes (e.g., increases in fuel prices) that are foregone by suboptimal exercise of offerings by Purchasers. Such delay between Purchaser and Distributor offering exercise and/or suboptimal exercise by either Purchaser or Distributor may be considered by the Provider in pricing matrix generation and/or hedging strategies.

Financial Structure Pricing

Figure 4A:
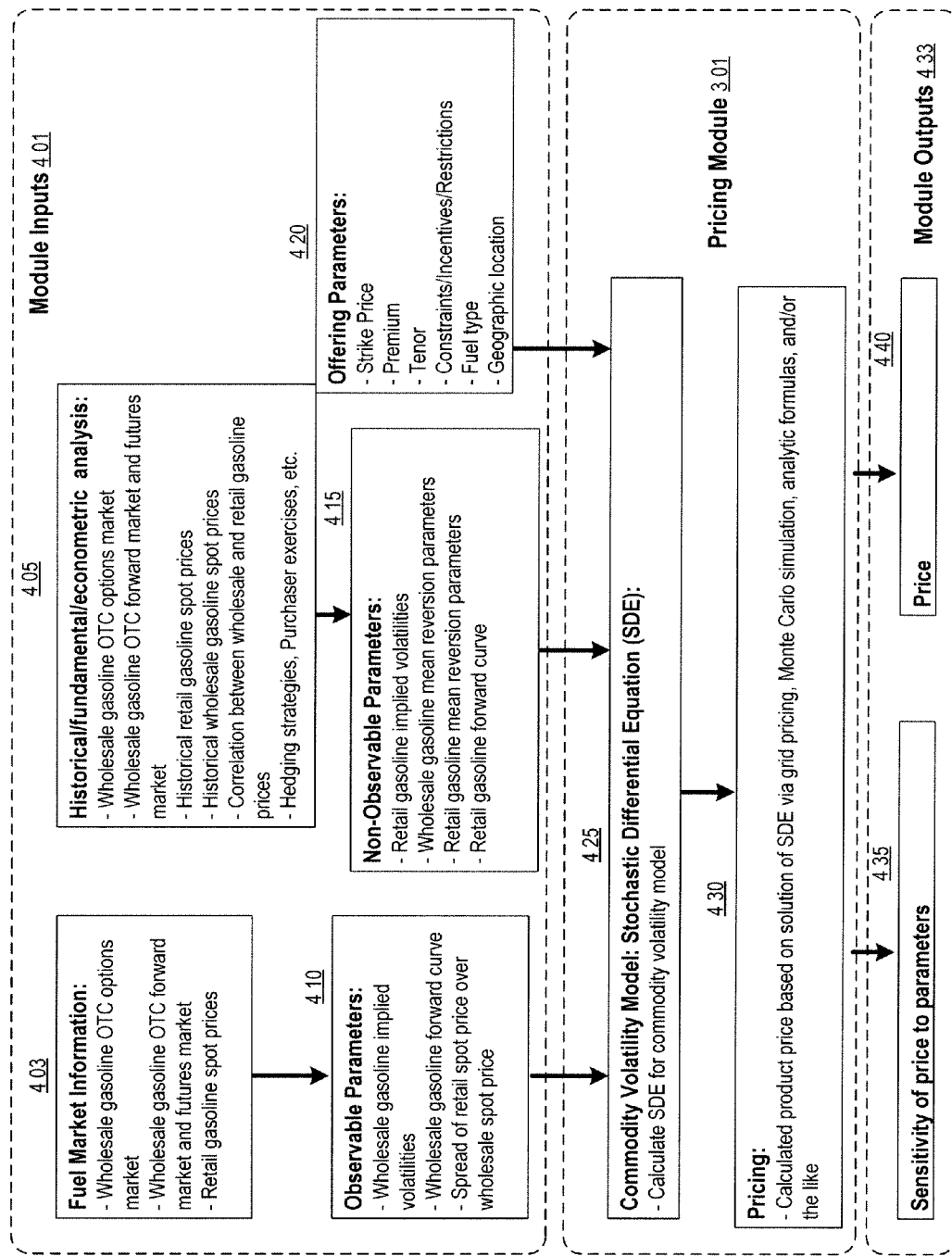
FIGS. 4A-B illustrate operation of financial structure pricing and price-pump model operation in respective embodiments of Fuel Offering Generator operation.
Figure 4B:
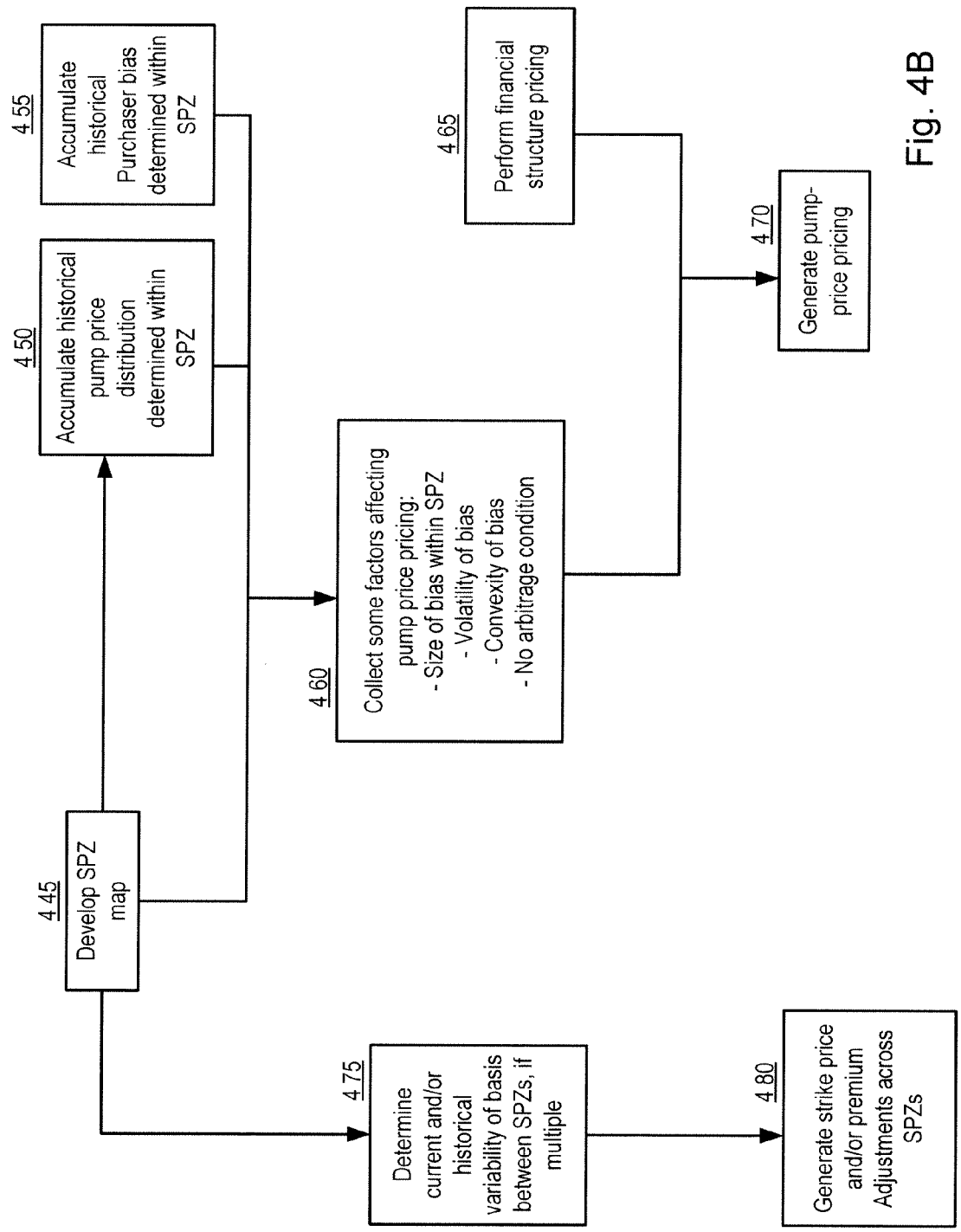

FIGS. 4A-B show operation of financial structure pricing and price-pump model operation in respective embodiments of Fuel Offering Generator operation. FIG. 4A shows processing flow for pricing of offerings in one embodiment of Fuel Offering Generator operation. A collection of module inputs 401 may comprise current fuel market information 403, historical fuel market information and/or analysis 405, and observable 410 and non-observable 415 parameters derived therefrom. Some examples of possible current fuel market information 403 may include current wholesale gasoline OTC options market data, current wholesale gasoline OTC forward market and futures market data, current retail gasoline spot prices, and/or the like. Some examples of possible historical market information and/or analysis 405 may include historical wholesale gasoline OTC options market data, historical wholesale gasoline OTC forward market and futures market data, historical retail gasoline spot prices, historical wholesale gasoline spot prices, correlations between historical retail and wholesale gasoline prices, and/or the like. Some examples of observable parameters 410 that may be derived from current fuel market information may include wholesale gasoline implied volatilities, wholesale gasoline forward curves, spread of retail over wholesale spot prices, and/or the like. Some examples of non-observable parameters 415 that may be derived from historical fuel market information and/or analysis may include retail gasoline implied volatilities, wholesale gasoline mean reversion parameters, retail gasoline mean reversion parameters, retail gasoline forward curves, and/or the like.

In one implementation, the pricing module may also admit as inputs a collection of Purchaser historical data. Purchaser historical data may be comprised of records of Purchaser execution and/or exercise of offerings. In particular, the system may monitor Purchaser execution and/or exercise of offerings with specific attention to particular Purchaser behavior flags. In one implementation, a Purchaser behavior flag may comprise consistent solicitation of and/or exercising of offerings at more expensive than average fuel retailers. In another implementation, a Purchaser behavior flag may comprise consistent solicitation of and/or exercising of offering at cheaper than average fuel retailers. In another implementation, a Purchaser behavior flag may comprise too optimal a pattern of offering exercising. In another implementation, a Purchaser behavior flag may comprise too suboptimal a pattern of offering exercising. In another implementation, a Purchaser behavior flag may comprise strong time dependence of Purchaser exercising of offerings. If the number of observed Purchaser behavior flags exceeds a threshold minimum value, a Purchaser behavior history variable admitted as input to the pricing module may be adjusted so as to cause the pricing module to yield an adjusted pricing matrix intended to correct and/or direct future Purchaser behavior.

In addition to the aforementioned factors and variables, the pricing module may admit a collection of offering parameters that may specify offering terms presented to a Purchaser. Some examples of possible offering parameters may include strike price, premium, tenor, constraints, restrictions, incentives, discounts, fuel type, geographic location, and/or the like. In one implementation, a pricing module operator (e.g., Provider) may set values for some offering parameters and receive others as outputs from the pricing generator. For example, a particular desired strike price, tenor, set of restrictions, fuel type, and location may be input to the pricing module, and a premium received as an output from the module. Alternatively, a particular desired premium, tenor, set of restrictions, fuel type, and location may be input to the pricing module, and a strike price received as an output from the module. The particular mode of operation, including selection of offering parameter inputs and outputs, may be varied within different implementations depending on the particular goals and/or requirements of particular applications of the system.

Values for a selected group of module inputs 401 may be fed into the pricing module 301 for processing. Inputs are incorporated into an offering pricing model 425 such as, in one implementation, a commodity volatility model incorporated into a stochastic differential equation describing commodity value. An example of such a model is provided in U.S. Pat. No. 7,065,475 entitled, "Modeling Option Price Dynamics," filed on Oct. 31, 2000, which is incorporated in its entirety herein by reference. U.S. Pat. No. 7,980,960 entitled, "System and method for providing a fuel purchase incentive," filed on Mar. 28, 2001, and U.S. application Ser. No. 09/853, 196 entitled "System and method for providing a fuel purchase incentive with the sale of a vehicle," filed May 11, 2001, are each incorporated in their entirety by reference. Solving a stochastic differential equation to extract output offering parameters may be accomplished by a variety of techniques in different embodiments, such as but not limited to grid pricing, Monte Carlo simulation, analytic formulas, and/or the like.

In one implementation, the XML for module inputs may take the following form:

```
<module_inputs>
    <observables>
        <WG_implied_vol> Jan08-Mar08, 30%,
        Apr08-Dec08, 25%
        </WG_implied_vol>
        <WG_forward_curve> Jan08-Jun08, $2/gal,
Jul08-Dec08, $2.2/gal
        </WG_forward_curve>
        <Retail_wholesale_spot_spread> $0.8/gal
        </Retail_wholesale_spot_spread>
    </observables>
    <non-observables>
        <RG_implied_vol> 20%
        </RG_implied_vol>
        <WG_mean_reversion> 0.5
```

-continued

```
        </WG_mean_reversion>
        <RG_mean_reversion> 0.5
        </RG_mean_reversion>
        <RG_forward_curve> $2.9/gal
        </RG_forward_curve>
    </non-observables>
    <offering_parameters>
        <premium> $0.15/gallon </premium>
        <tenor> 3 months </tenor>
        <restrictions>
            <total_volume> 60 gallons </total_volume>
            <cap> 20 gallons/month </cap>
        </restrictions>
        <fuel_type> "regular" gasoline (87 octane)
        </fuel type>
        <location> New York Metro </location>
        <index> New York Metro Average published by
        DOE</index>
    </offering_parameters>
</module_inputs>
```

The pricing module 301 subsequently outputs sensitivity data 435 and price data 440. Price data 440 may, as discussed above, be comprised of different offering parameters depending on the requirements and consequent module inputs within a particular implementation. Thus, the price data 440 output may include, but is not limited to, strike price, premium, tenor, restrictions, usage constraints, incentives, fuel type constraints, geographic constraints, and/or the like. Sensitivity data 435, as discussed above, describes the extent to which price data 440 may vary as module inputs 401 are varied. In one implementation, sensitivity data may be comprised of the first derivative of a price data variable with respect to one or more module input variables.

In one implementation, the XML for module outputs may take the following form:

```
<module_outputs>
    <sensitivity_data>
        <WG_implied_vol_sensitivity> Jan08-Jun08,
$1000 per percent vol move, Jul08-Dec08, $500 per percent vol move
        </WG_implied_vol_sensitivity >
        <WG_forward_curve_sensitivity > Jan08 - Jun08,
$500 per $1/gal move, Jul08-Dec08, $750 per $1/gal move
        </WG_forward_curve_sensitivity >
        <Retail_wholesale_spot_spread_sensitivity > $3000
per $1/gal move
        </Retail_wholesale_spot_spread_sensitivity >
        <RG_implied_vol_sensitivity >$1500 per percent
vol move
        </RG_implied_vol_sensitivity >
        <WG_mean_reversion_sensitivity > $200 per
0.1 move in mean-reversion
        </WG_mean_reversion_sensitivity >
        <RG_mean_reversion_sensitivity >$150 per
0.1 move in mean-reversion
        </RG_mean_reversion_sensitivity >
        <RG_forward_curve_sensitivity > Jan08 - Jun08,
$700 per $1/gal move, Jul08-Dec08, $600 per $1/gal move
        </RG_forward_curve_sensitivity >
    </sensitivity_data>
    <price_data>
        <strike_price> $2.89/gallon </strike_price>
    </price_data>
</module_outputs>
```

The pricing module output described by the above XML includes a single strike price within the price_data/strike_price field. In an alternative implementation, a Provider may determine price_data for a variety of module input values in order to yield an array of price_data with different corresponding offering parameters. Such an array of price data with corresponding offering parameters may be incorporated into a pricing matrix. In one implementation, the XML for a three-offering pricing matrix may take the following form:

```
<pricing_matrix>
    <offering1>
        <strike_price> $2.89 </strike_price>
        <premium> $0.15/gallon </premium>
        <tenor> 3 months </tenor>
        <restrictions>
            <total_volume> 60 gallons </total_volume>
            <cap> 20 gallons/month </cap>
        </restrictions>
        <fuel_type> "regular" gasoline (87 octane) </fuel type>
        <location> New York Metro </location>
        <index> New York Metro Average published by DOE</index>
    </offering1>
    <offering2>
        <strike_price> $3.02 </strike_price>
        <premium> $0.10/gallon </premium>
        <tenor> 3 months </tenor>
        <restrictions>
            <total_volume> 60 gallons </total_volume>
            <cap> 20 gallons/month </cap>
        </restrictions>
        <fuel_type> "regular" gasoline (87 octane) </fuel type>
        <location> New York Metro </location> </offering2>
        <index> New York Metro Average published by DOE</index>
    </offering2>
    <offering3>
        <strike_price> $2.94 </strike_price>
        <premium> $0.15/gallon </premium>
        <tenor> 6 months </tenor>
        <restrictions>
            <total_volume> 60 gallons </total_volume>
            <cap> 20 gallons/month </cap>
        </restrictions>
        <fuel_type> "regular" gasoline (87 octane) </fuel type>
        <location> New York Metro </location>
        <index> New York Metro Average published by DOE</index>
    </offering3>
</pricing_matrix>
```

Pump-Price Model and Pricing

FIG. 4B shows logic flow for determination of offering pricing within a pump-price model context in one embodiment of Fuel Offering Generator operation. Although geography is not necessarily central to the price structure itself, it is relevant, and greater detail about the may be found in FIGS. 10-11. In this embodiment, the strike price associated with an offering is compared with the price charged by the particular fuel retailer at which an offering is exercised in assessing the extent of pay-out obliged to an exercising Purchaser. For example, in a non-prepay embodiment wherein a Purchaser has only paid a premium upfront, if a Purchaser exercises an offering based on a strike price of $2.20 for a gallon of gasoline at a retailer that charges $2.40/gallon, the Purchaser may be refunded $0.20/gallon by the Provider, while the same offering exercised at a retailer charging $2.55 would yield $0.35/gallon if exercised. In an alternative, prepay embodiment wherein a Purchaser has paid both strike price and premium up front, the Provider would directly pay the gas station the cost of the fuel based on either the $2.40 or $2.55 pump prices. Due in part to the pump-specific sensitivity of this model, a number of additional restrictions and/or structural considerations, such as management of geographic price variations and undesirable Purchaser behavior, may be implemented to facilitate desired Generator operation and will be described in greater detail below. These factors may, in one implementation, be incorporated into determination of up-front pricing (e.g., premiums) for fuel offerings. They may also, or in an alternative implementation, be considered as part of fuel offering redemption structure as discussed below and in FIGS. 10-12 and 14-21.

Owing to the dependence of pump-price model payout on the price at the pump itself, considerations of variability between pump prices in different geographic regions must be incorporated. The Generator develops a Single-Price Zone (SPZ) map at 445, wherein an SPZ is defined as a region and/or collection of retailers defined by a single, uniform pricing assignment. For example, a Purchaser may exercise an offering with the same strike price at a given premium at all retailers belonging to the same SPZ. SPZ map determination is described in greater detail below in FIGS. 10-11. The SPZ map defines SPZ boundaries and may guide the accumulation of historical pump price distribution data for a given SPZ 450. Historical Purchaser bias data may also be accumulated for a given SPZ 455. Purchase bias data may, in one implementation, describe the extent to which Purchasers tend to exercise offerings at retailers that are biased to one side or the other of the average of retailers within the SPZ. For example, a large Purchaser bias may indicate that Purchasers tend to exercise their offerings disproportionately often at expensive fuel retailers. The SPZ map and accumulated data may be employed to determine and/or collect further factors relevant to pricing within the pump-price model 460. These factors may include the size of Purchaser bias with an SPZ, volatility of that bias, convexity of that bias, and the existence of a no-arbitrage condition. Convexity of bias in this context may, in one implementation, be construed to describe the extent to which there is a difference in the average pay-out amount between those offerings based on the difference between strike price and an average retailer pump price and those offerings based on the difference between a strike price and a pump price at which the offering is exercised. Volatility of bias reflects the extent to which the distribution of prices within an SPZ may vary over time and the effect of such variation on deviations of Purchaser behavior from average expectations. The no-arbitrage condition in this context may, in one implementation, be construed to describe the avoidance of a situation where a Purchaser can buy an offering and immediately exercise to make riskless profit. These and other factors discussed may affect the cost of offerings and, consequently, be considered in either the up-front pricing (e.g., premium) of offerings, or in the devising of incentives, restrictions, discounts, and penalties. A financial structure pricing determination is performed at 465, similar to those described above in the context of the financial structure pricing model above, and the output premium and/or strike price is adjusted by an amount determined by the factors in 460 to yield a pump-price pricing 470.

An example of a premium adjustment made as part of the price-pump model may be to determine the average pump price within an SPZ, compute the total payout for an offering exercised at all retailers charging higher than that average, divide by the total number of retailers, and add this quantity (the convexity of bias, in one implementation) directly to the premium. Another example of a premium adjustment made as part of the price-pump model may be to determine the standard deviation of average retailer pump prices within an SPZ over some period of time and add that deviation, or some fraction thereof, to the premium. Further premium and/or strike price adjustments may be implemented within different embodiments of the Fuel Offering Generator.

Based on the SPZ map developed in 445, the Generator may determine current and/or historical variability of basis (i.e., difference) between SPZ premiums and/or strike prices for a given collection of SPZs, such as a collection that is incorporated as part of a Purchaser offering. Based on that information, the Generator may yield strike price and/or premium adjustments and/or a premium adjustment table, as described in greater detail in FIGS. 10-14. The adjustment of premium price based on geographic considerations and/or the generation of a premium adjustment table may be relevant, in one implementation, to only those fuel offerings that cover fuel purchases made in multiple SPZs.

Customer Interaction Flow

FIG. 5 illustrates an aspect of purchase and fuel offering exercise for one embodiment of the Fuel Offering Generator. Prior to discussing process FIG. 5 in detail, it is instructive to first review, in a broad sense, the Purchaser's perspective of Fuel Offering Generator. The Purchaser may be an entity who desires to purchase fuel offering to mitigate fuel costs over some period of time. In accordance with this goal, a number of fuel offerings may be made available for purchase by the Distributor. A fuel offering may include specific details regarding the terms and conditions, as shown in the below example.

| Type | Quantity | Strike Price | Tenor | Premium |
|---|---|---|---|---|
| Diesel | 30k gallons | $2.50 | 3 months | $0.40 |

The example fuel offering has a tenor of three months, during which the Purchaser may exercise the fuel offering on up to 30 k gallons of diesel fuel at a strike price of $2.50. The premium may, in some embodiments, represents the measure of risk associated with the fuel offering, i.e., higher premiums may correlate to higher risk fuel offerings. By purchasing the fuel offering shown above, the Purchaser mitigates the risk of fuel costing in excess of $2.90 (strike+premium) over the three month tenor. That is, by purchasing the fuel offering, the Purchaser pays $0.40 for the ability or right to purchase fuel for $2.50, up to the stipulated number of gallons (e.g., 30 k). In some embodiments, an offer price of $2.90 (strike+premium) may represent the Purchaser's effective purchase price for any purchase made within the 3 month period for up to 30 k gallons of fuel if the cost of fuel over that three month period exceeds the offer price. As is apparent to the astute reader, exercising the fuel offering does not clearly provide economic benefit to the Purchaser for prevailing pump prices and/or national average prices below $2.90, though it may still be beneficial to the Purchaser to exercise the offering between $2.50 and $2.90 because the premium is, at that point, a sunk cost.

As shown in FIG. 5, the Purchaser purchases a fuel offering with a particular strike price for certain fuel volume (N) 505. At some point subsequent to the purchase of the fuel offering, the Purchaser may decide to purchase X gallons of fuel 510. In so doing, the Purchaser may elect to exercise the offering on the fuel purchase of X gallons or not 515, generally depending upon the pump price of fuel at the time of purchase. In the case where the cost of fuel is less than the strike price, it does not make economic sense for the Purchaser to exercise the offering, for reasons described above, and in such a situation, the Purchaser may simply pay the prevailing pump price 525. Alternatively, in the case where the cost of fuel is greater than the strike price, particularly where the cost of fuel is greater than the strike price+premium, it may make economic sense to exercise the fuel offering 520, though the Purchaser may not necessarily exercise the fuel offering (e.g., if the Purchaser expects the cost of fuel to be even higher the next day). In some embodiments, the fuel offering may be automatically exercised whenever the cost of fuel is greater than the strike, or alternatively, the strike+premium. In another embodiment, the fuel offering is not exercised automatically. If the Purchaser decides to exercise the fuel offering 515, the Purchaser profile (e.g., a data file that includes information regard the Purchaser's fuel offering(s)) or like information source regarding the fuel offering may be queried to determine the unused fuel volume (R) remaining for the fuel offering 520. A determination is then made as to whether the remaining volume (R) is equal to or greater than purchase volume (X) 530. If not, then the Purchaser pays the prevailing pump rate 525 for the full purchase. In another embodiment the Purchaser may be able to exercise the fuel offering for a partial amount of the full purchase (i.e., for the remaining volume). Otherwise, a determination is made regarding whether the prevailing pump price (or other price, such as the national average price, as indicated by the implementation) is greater than the strike price 540. If so, the Purchaser's account is credited with the difference (D) between the strike price and the pump price, multiplied by the number of gallons (X) purchased 545. Otherwise, in the case where the prevailing pump price is determined to be less than the strike price 540, the Purchaser pays the prevailing pump price 550.

Figure 5A:
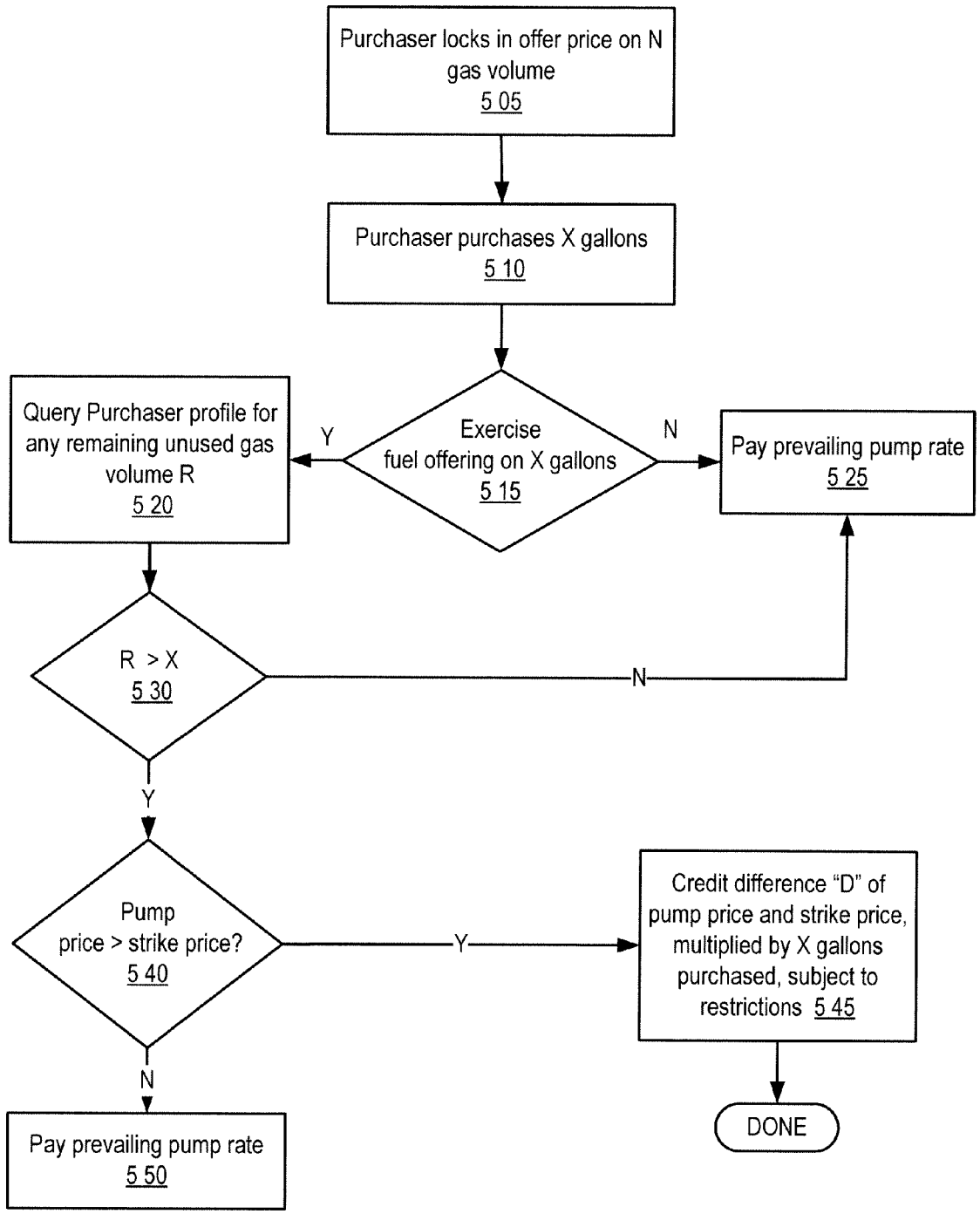
FIGS. 5A-D illustrate operation aspects for some embodiments of the Fuel Offering Generator.
Figure 5B:
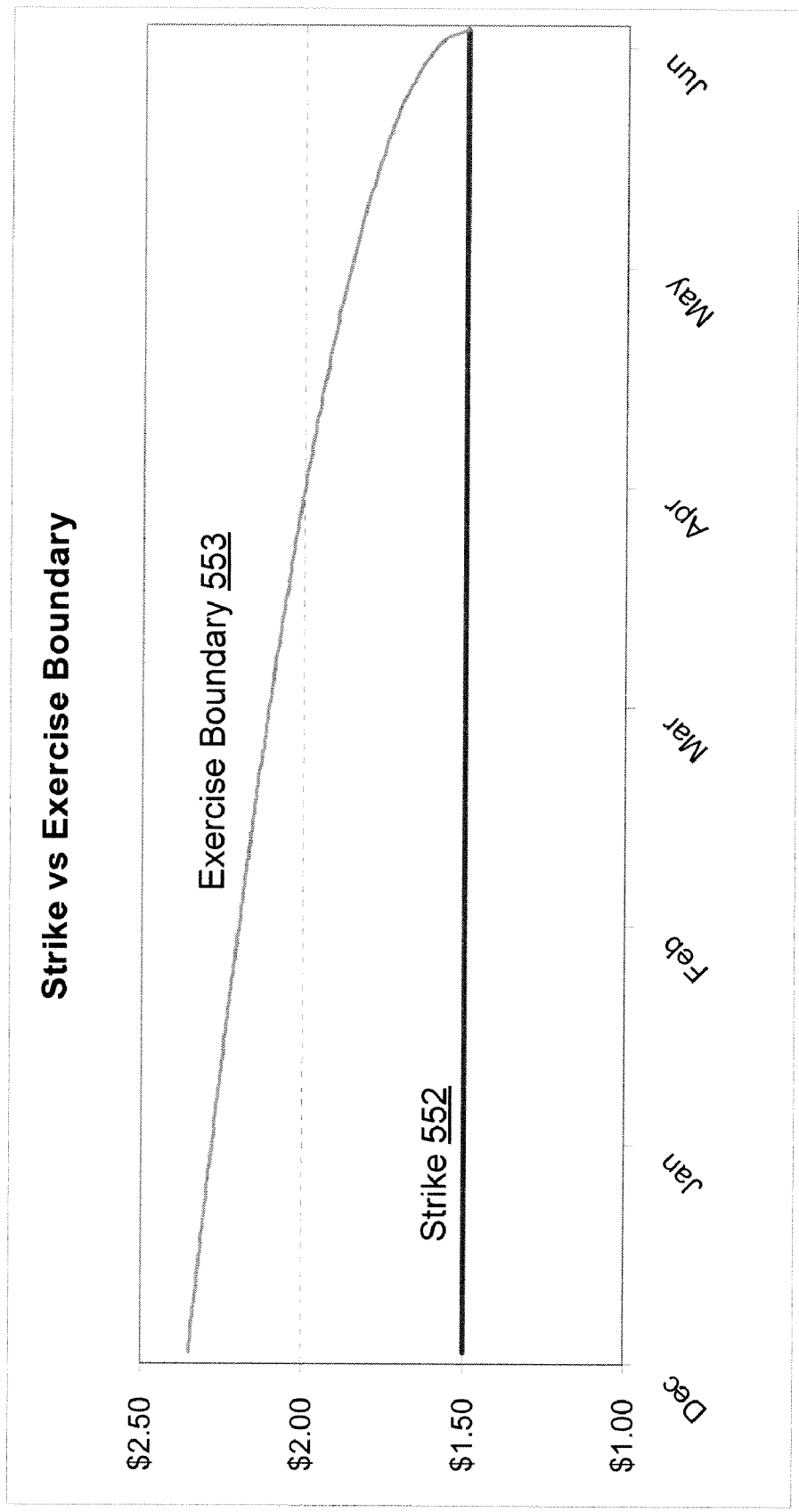

FIG. 5B provides an example strike vs. exercise graph for one embodiment of the Fuel Offering Generator. The strike 552 is the strike price (e.g., $1.50) of the fuel offering and the exercise boundary 553 represents the price over which exercise of the fuel offering is approximately economically optimal over the tenor (e.g., 6 months) of the offering. The exercise boundary 553 is initially the strike 552 plus an initial boundary and decreases to the strike at the end of the tenor of the offering. In some embodiments, the optimal initial boundary is found by maximizing the average pay-out across a range of initial boundaries, and the resulting exercise behavior (e.g., economically optimal exercise) used to model Purchaser behavior, including average pay-out.

Figure 5C:
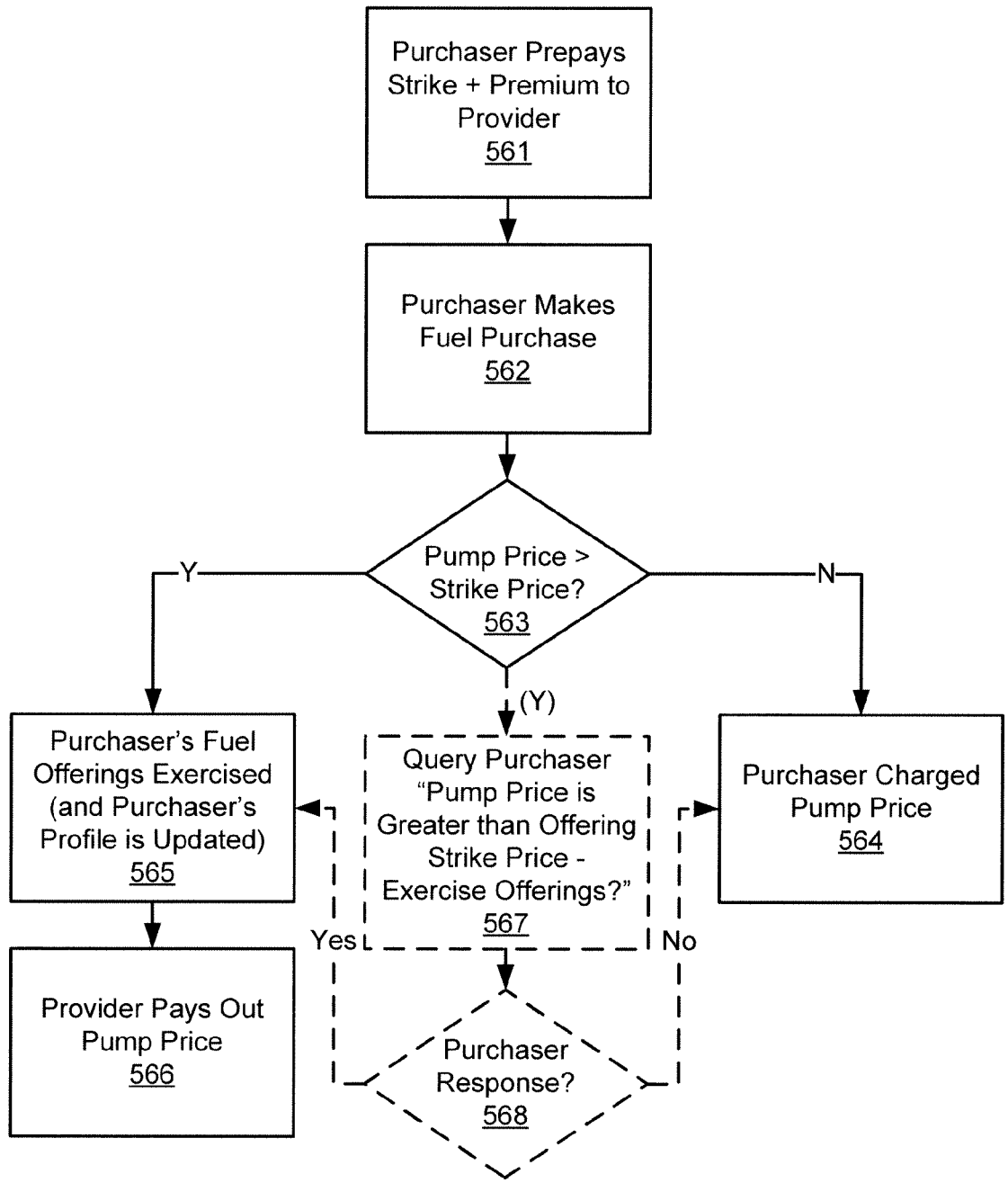
Figure 5D:
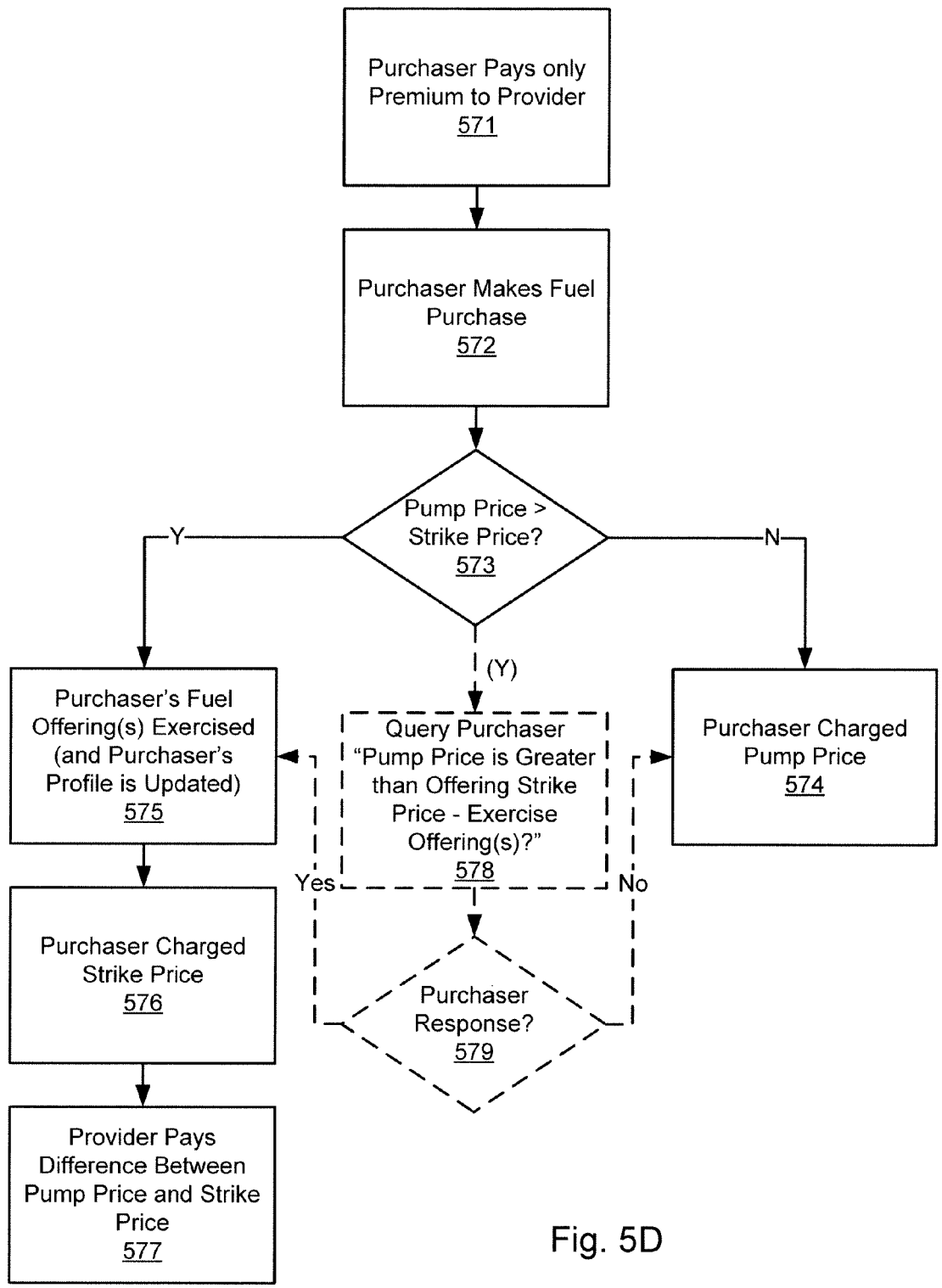

FIGS. 5C and 5D provide further illustrate payout aspects for some embodiments. FIG. 5C provides a flow diagram for an embodiment in which the Purchaser prepays the strike price (e.g., pays the premium plus the strike) to the Provider 561 and/or Distributor at the time of purchasing the fuel offering. When the Purchaser subsequently makes a fuel purchase 562, there is a determination of whether the pump price is greater than the strike price 563, and if not, the Purchaser is charged the pump price 564. If the pump price is greater than the strike price 563 (or another threshold price as determined by the implementation), in one embodiment, the Purchaser's fuel offering(s) is(are) exercised and Purchaser's profile is updated 565, and the Provider (and/or Distributor) pays out the pump price 566 (e.g., to the fuel retailer). In another embodiment, if the pump price is greater than the strike price 563 (or like threshold price), the Purchaser may be notified and queried to determine if they wish to exercise their offering(s) 567 with the Purchaser's response 568 determining the next action (564/565).

FIG. 5D provides a flow diagram for an embodiment in which the Purchaser pays the premium to the Provider 571 and/or Distributor at the time of purchasing the fuel offering. When the Purchaser subsequently makes a fuel purchase 572, there is a determination of whether the pump price is greater than the strike price 573, and if not, the Purchaser is charged the pump price 574. If the pump price is greater than the strike price 573 (or another threshold price as determined by the implementation), in one embodiment, the Purchaser's fuel offering(s) is(are) exercised and Purchaser's profile is updated 575, the Purchaser is charged the strike price 576 (e.g., pays the strike price to the fuel retailer) and the Provider (and/or Distributor) pays out the difference between the strike and the pump price 577 (e.g., to the fuel retailer). In another embodiment, if the pump price is greater than the strike price 573 (or like threshold price), the Purchaser may be notified and queried to determine if they wish to exercise their offering(s) 578 and the Purchaser's response 579 decides the next action (574/575).

Minimum Usage Requirement

Figure 6:
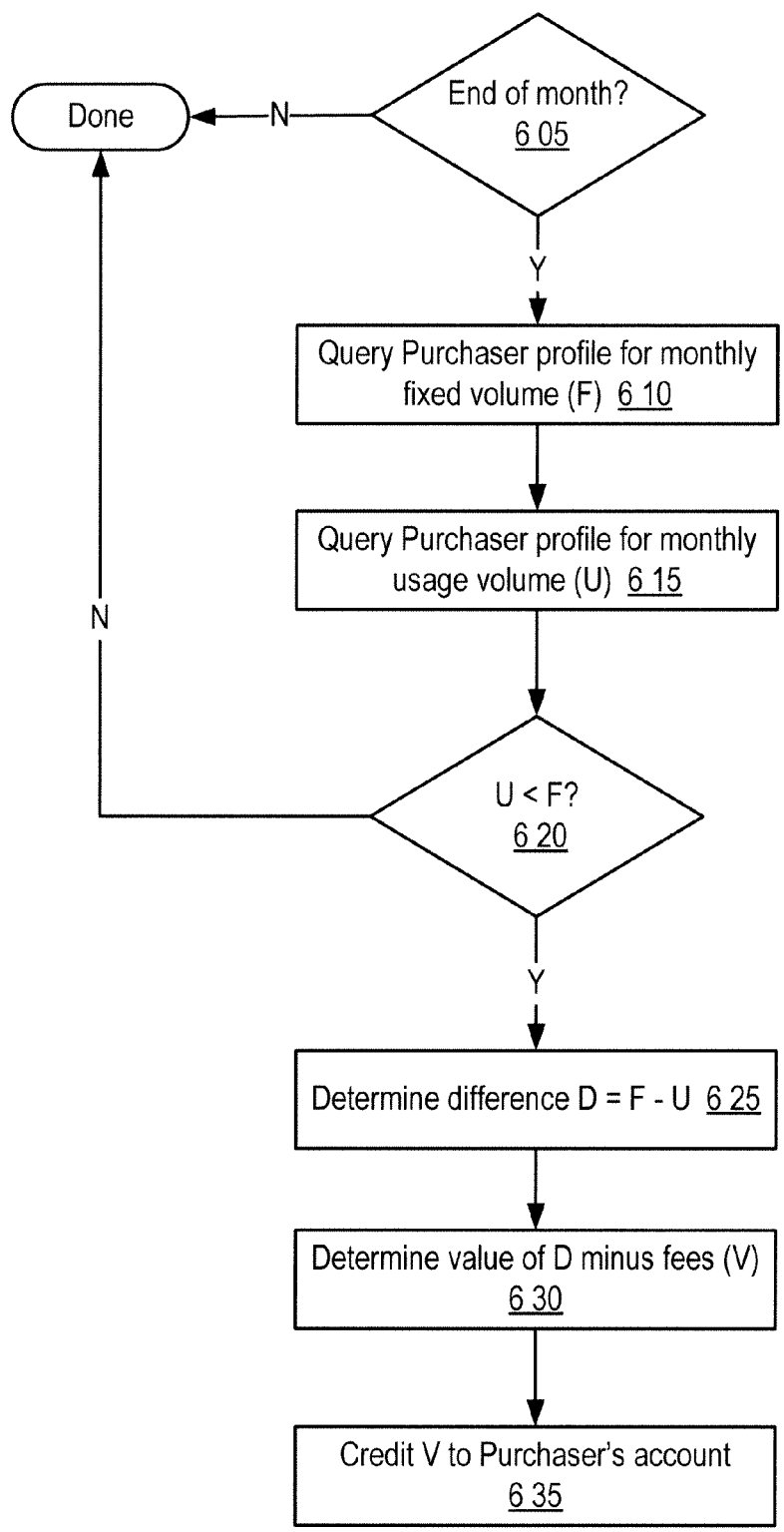
FIG. 6 illustrates a fixed volume aspect of fuel offerings in one embodiment.

FIG. 6 illustrates an aspect of enforcing minimum usage of fuel offerings in an embodiment of the Fuel Offering Generator. Prior to discussing FIG. 6 in detail, it is instructive to first briefly review the structure and purpose of imposing minimum fuel usage consumption. In some embodiments, a fuel offering sold to a Purchaser may include a restriction directed to the manner in which the fuel offering is exercised over the specified tenor. As one example, consider an example fuel offering with the terms below.

| Type | Quantity | Strike Price | Tenor | Premium |
| --- | --- | --- | --- | --- |
| Diesel | 30k gallons | $2.50 | 3 months | $0.40 |

The exemplary terms of the illustrative fuel offering indicate a tenor of three months, during which the Purchaser may purchase up to 30 k gallons of fuel at a strike price of $2.50. To preclude the consumption of 30 k gallons all the end, or in disproportionate amounts over the three month tenor, it is contemplated that some embodiments may impose a minimum monthly usage requirement. In this manner, more predictable exercise of fuel offerings may be achieved. Of course, in other embodiments, the restriction period may be of a longer or shorter duration (e.g., quarterly minimum usage, weekly minimum usage) in accordance with the fuel offering tenor, and may be allocated in a variable fashion.

Referring now to FIG. 6, in one embodiment, enforcing a monthly minimum usage begins with a determination regarding whether the end of the current calendar date coincides with the end of the month 605 or some other stipulated period. The Purchaser's profile is queried to determine the monthly fixed volume (F), which represents the amount that the Purchaser must use per month 610. The Purchaser's profile is queried a second time to retrieve the total quantity of fuel already consumed by the Purchaser for the current month, (U) 615. A determination is then made regarding whether the total quantity of fuel already consumed in the current month (U) is greater than the fixed volume (F) 620. If so, the process terminates because it is determined that the Purchaser has already purchased in excess of the fixed volume (F) for the current month. Otherwise, a calculation is performed to compute the difference (D) between the fixed volume (F) and the total quantity of fuel already consumed (U) 625. A further evaluation is performed to determine the amount to be credited to the Purchaser's account for the unused portion. The further calculation determines an amount to be credited (V) corresponding to the value of (D) minus any fees (e.g., due to failure to meet fixed volume requirements), multiplied by the strike price 630. This amount (V) may then be credited back to the Purchaser's account 635.

For example, in one embodiment, if a Purchaser purchases a fuel offering for a quantity of 500 gallons of gasoline over a tenor of 10 months, the fuel offering may specify a minimum monthly usage of 50 gallons, i.e., F=50. In this exemplary case, if the Purchaser uses less than 50 gallons in the first month (e.g., 20 gallons), then the balance, 30 gallons (i.e., the unused portion), is deducted from the Purchaser's total available volume, leaving 450 gallons at the start of the second month. In one embodiment, in the event of a prepay, the strike price for the deducted (i.e., unused) gallons may be returned to the Purchaser, while in another embodiment the prepayed strike for the deducted gallons are not returned to the Purchaser. Alternatively, if the Purchaser uses an amount in excess of 50 in a particular month (e.g., 70 gallons), then no action is required in that the Purchaser has met his or her minimum usage requirement for the month.

Maximal Fuel Usage Restrictions

Figure 7:
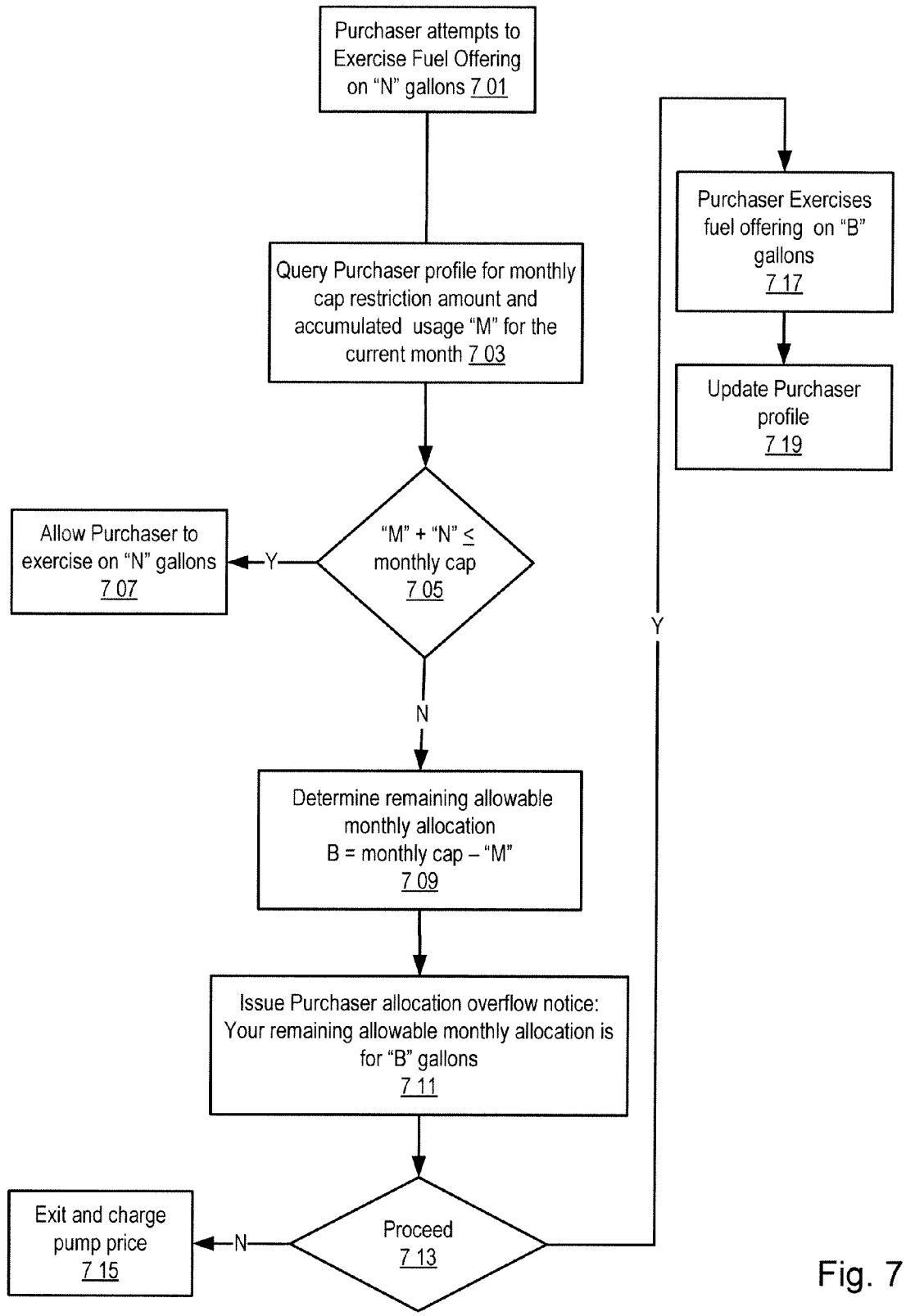
FIG. 7 illustrates an aspect of fuel usage restrictions for fuel offerings in one embodiment.

With reference now to FIG. 7, there is shown a process for enforcing periodic (e.g., monthly) maximum fuel usage restrictions on fuel offerings. Prior to discussing process in detail, it is instructive to first briefly review the structure and purpose of monthly fuel usage restrictions. In general, a fuel offering sold to a Purchaser may include a restriction directed to the manner in which the fuel is consumed over the tenor of the offering. As one example, consider the following exemplary fuel offering—

| Type | Quantity | Strike Price | Tenor | Premium |
| --- | --- | --- | --- | --- |
| Diesel | 30k gallons | $2.50 | 3 months | $0.40 |

The exemplary illustrative offering has a tenor of three months, during which the Purchaser may consume up to 30 k gallons of fuel with a strike price of $2.50/gallon. To preclude the consumption of 30 k gallons all at once, or in grossly disproportionate amounts over the three month tenor, it is contemplated to impose a monthly cap (i.e., monthly maximum usage restriction). In this manner, more predictable consumption and/or exercising of offerings may be achieved. Of course, in other embodiments, the restriction period may be of a longer or shorter duration (e.g., quarterly cap, weekly cap) in accordance with offering tenor.

Referring again to FIG. 7, the process for enforcing a monthly cap restriction begins with a Purchaser 220 attempting to exercise an offering on a quantity of fuel (e.g., "N" gallons) 701. In response, the Purchaser's profile is queried to determine a cap (e.g., monthly cap) amount specified as offering parameters within an offering owned by the Purchaser. The Purchaser's profile may also be queried to retrieve a total quantity of fuel, "M", previously consumed by the Purchaser for the current month 703. A determination is then made as to whether the sum of the fuel already consumed "M" by the Purchaser in the current month plus the amount of fuel "N" on which the Purchaser seeks to exercise his or her offering(s) is less than or equal to the monthly cap restriction 705. If so, the Purchaser is permitted to exercise on "N" gallons of fuel 707. Otherwise, a determination is made of the remaining amount of fuel that may be allocated to the Purchaser to stay within the limitations of the imposed monthly cap 709. The remaining amount which may be allocated is an amount "B", less than the requested amount "N", which may be determined by subtracting the amount of fuel already consumed in the month "M" from the monthly cap. The Purchaser may, in one implementation, be issued a notice indicating that the Purchaser's remaining allowable monthly allocation is "B" gallons 711. The Purchaser may be offered the choice to proceed or not with the exercise of his or her offering on "B" gallons 713. In the case where the Purchaser elects not to proceed with exercising the offering, the Purchaser may be charged the pump price 715. Otherwise, in the case where the Purchaser elects to proceed, the Purchaser is permitted to exercise his or her offering on "B" gallons 717 and the Purchaser's profile is updated to reflect the exercise of the offering 719. In an alternative embodiment, the Purchaser may be automatically charged the pump price if the exercise puts the Purchaser over the cap for the period.

In various embodiments, maximal usage restrictions may be implemented on a periodic, quasi-periodic, or non-periodic basis. For example, usage caps may be implemented and/or varied yearly, seasonally, monthly, weekly, daily, hourly, based on fiscal quarters, based on holiday travel patterns, based on expected high-traffic time periods, and/or the like. In one embodiment, the usage cap per period may be uniform over the tenor of the offerings owned by a Purchaser, such as being set to the total quantity of fuel covered by the offerings divided by the number of periods covered by the offering tenor. In another embodiment, the usage cap per period may vary from period to period.

Cap Payout Restriction

Figure 8:
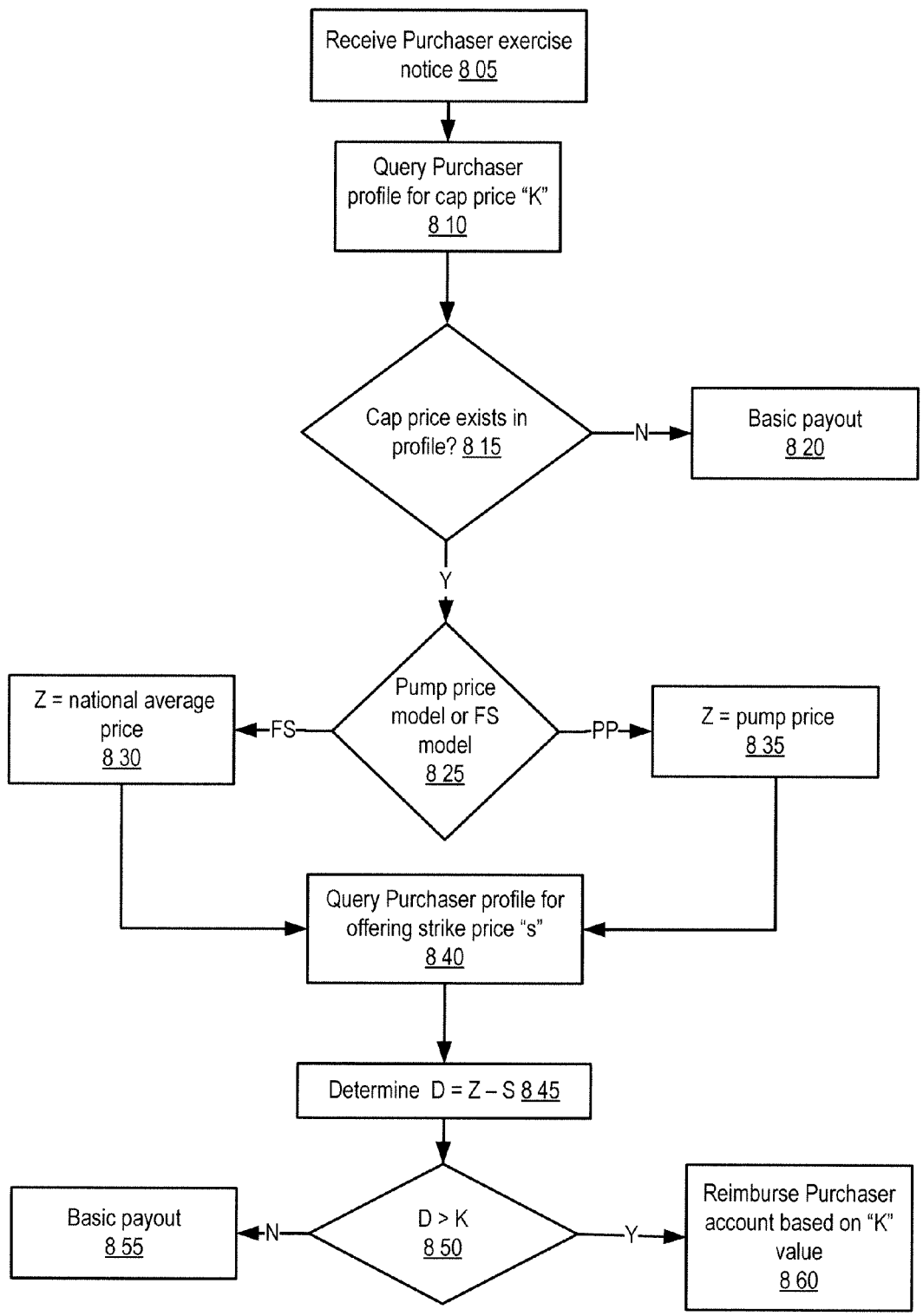
FIG. 8 illustrates an aspect of cap restrictions for fuel offerings in one embodiment.

With reference now to FIG. 8, there is shown a process for enforcing a cap payout restriction on fuel offerings in one embodiment. Prior to discussing the process in detail, it is instructive to first briefly review the structure and purpose of cap payout restrictions. In general, a fuel offering sold to a Purchaser may include a restriction directed to limiting the difference paid between the strike price and some reference price (e.g., pump price, national average price, spot price, and/or the like) in order to minimize Provider and/or Distributor exposure and/or liability. As one example, consider the following exemplary fuel offering—

| Type | Quantity | Strike Price | Tenor | Premium |
|---|---|---|---|---|
| Diesel | 30k gallons | $2.50 | 3 months | $0.40 |

The exemplary illustrative offering has a tenor of three months, during which the Purchaser may consume up to 30 k gallons of fuel with a strike price of $2.50/gallon. To preclude the Purchaser from exercising the offering on purchases where the pump price or national average price is far in excess of the strike price, it is contemplated to impose a cap restriction on the payout. In other words, a payout cap may be established such that when the Purchaser exercises his or her offering, the amount paid cannot exceed the payout cap. In this manner, a higher degree of certainty is guaranteed regarding payouts. More particularly, the payout is assured not to exceed the payout cap. For example, if a Purchaser seeks to exercise an offering with a strike price of $2.50/gallon on fuel with a reference price of $3.50/gallon, and the payout cap is set to $0.50/gallon, the Purchaser will may only redeem $0.50/gallon rather than the $1.00/gallon he or she would receive in the absence of the payout cap. In an alternative embodiment, it is contemplated that the payout cap may be configured as a price cap, whereby any reference price exceeding the price cap on which a Purchaser seeks to exercise an offering may be replaced by the price cap for the purpose of determining payout obligations. In a non-prepay example, if a Purchaser seeks to exercise an offering with a strike price of $2.50/gallon on fuel with a reference price of $3.50/gallon, and the price cap is set to $3.00/gallon, the Purchaser will may only redeem $0.50/gallon rather than the $1.00/gallon he or she would receive in the absence of the price cap. In yet another embodiment, a payout and/or price cap may be expressed as some function of the premium and/or strike price (e.g., a percentage of the strike price).

Referring now to FIG. 8 in an implementation employing a payout cap, a Provider and/or Distributor may receive a notice of Purchaser exercise of an offering on some quantity of fuel 805. The Purchaser's profile may be queried to seek and/or extract a specified payout cap amount, "K" 810. A determination is made 815 as to whether such a cap exists in the Purchaser profile and, if not, then a basic payout amount is formulated 820 without consideration of a payout cap. Otherwise, the Generator queries a reference price corresponding to the offering being exercised. In one implementation, the Generator may determine whether the offering is subject to a pump-price reference price (e.g., the price of the retailer at which the fuel is purchased) or a financial structure reference price (e.g., a regional average price, a national average price, and/or the like) 825. In the former case, the reference price, Z, may be set to the pump price 835, and in the latter case, Z may be set to a national average price. A strike price, S, corresponding to the offering being exercised may be queried from a Purchaser profile 840, and a determination made of the difference, D, between S and Z 845. If that difference does not exceed the payout cap, K, then a basic payout is prepared 855 without consideration of a payout cap. Otherwise, the payout reimbursement to the Purchaser's account may be made based on the volume of fuel on which the offering is exercised subject to the payout restriction K.

In an alternative embodiment wherein a price cap is specified rather than a payout cap, the comparison at 850 would be between the price cap and the reference price, Z, and the payout amount at 860 would be based on the difference between the price cap and the strike price.

In various embodiments, price and/or payout caps may be implemented on a periodic, quasi-periodic, or non-periodic basis. For example, price and/or payout caps may be implemented and/or varied yearly, seasonally, monthly, weekly, daily, hourly, based on fiscal quarters, based on holiday travel patterns, based on expected high-traffic time periods, and/or the like. In one embodiment, price and/or payout caps per period may vary from period to period. In another embodiment, multiple different price and/or payout caps may be specified for different circumstances, including different locations, regions, SPZs, retailers, Purchasers, Distributors, Providers, times, periods of time, and/or the like.

Structural Constraint

Figure 9:
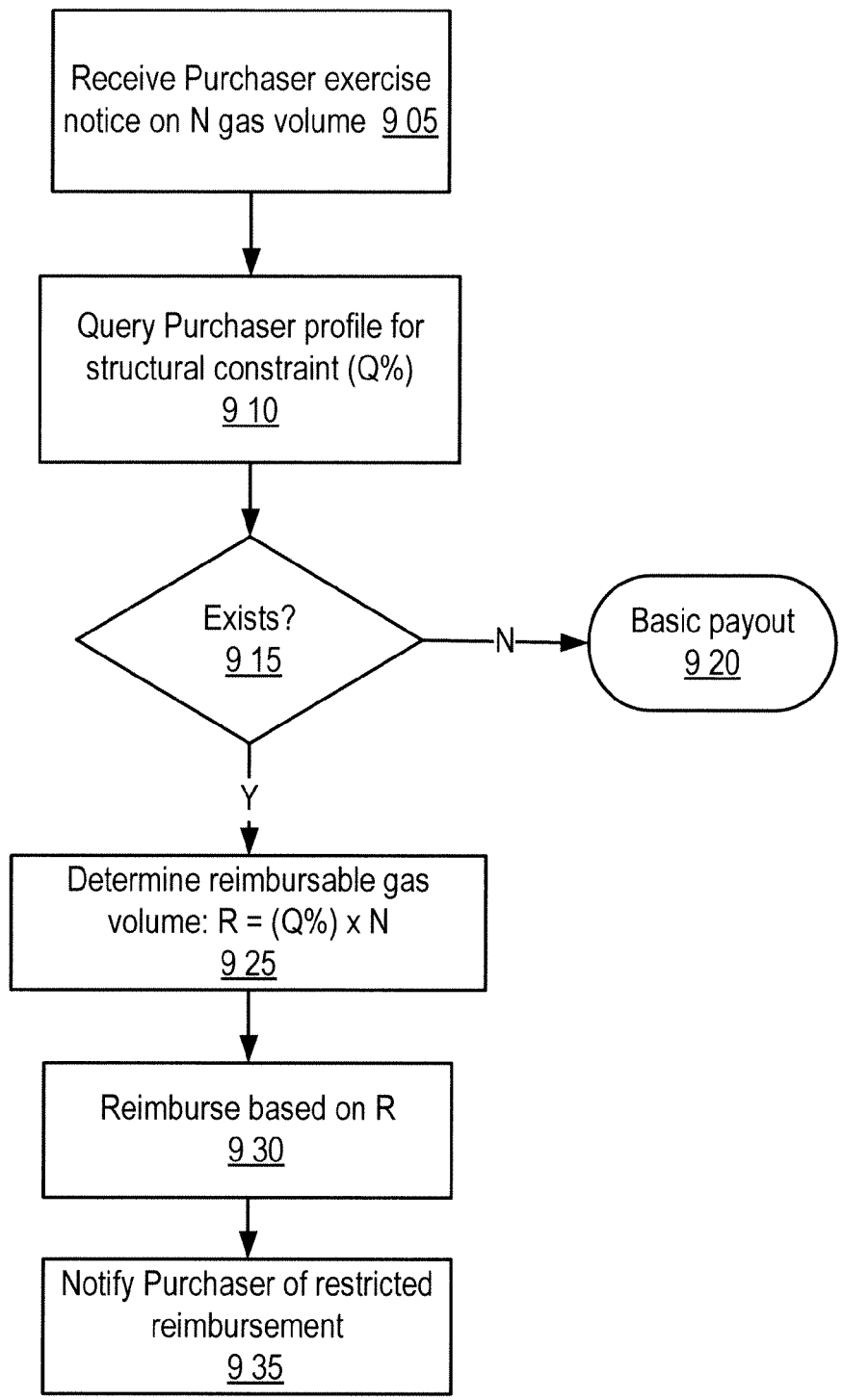
FIG. 9 illustrates an aspect of structural constraints of a fuel offering in one embodiment.

FIG. 9 illustrates one aspect of structural constraints in an embodiment of Fuel Offering Generator. Specifically, FIG. 9 provides details for implementing and/or enforcing a structural constraint on the amount (or percentage) of gas volume that may be reimbursed upon exercising a fuel offering for a particular fuel purchase of a volume (N). In general, a fuel offering sold to a Purchaser may include a restriction directed to the amount or percentage volume of a fuel purchase considered eligible for reimbursement upon exercising the fuel offering during its tenor. As one example, consider the following exemplary fuel offering terms—

| Type | Quantity | Strike Price | Tenor | Premium |
|---|---|---|---|---|
| Diesel | 30k gallons | $2.50 | 3 months | $0.40 |

The exemplary illustrative fuel offering has a tenor of three months, during which the Purchaser may exercise the fuel offering on up to 30 k gallons of fuel at a strike price of $2.50. To discourage the Purchaser from exercising the fuel offering at an fuel retailer that is relatively more expensive that other fuel retailers (e.g., a gas station that sells at $3.20 when most other stations sell at $3.00), some embodiments may impose a structural constraint that limits and/or specifies the amount (or percentage) of a fuel purchase on which a Purchaser may exercise the fuel offering.

As shown in FIG. 9, enforcing a structural constraint pertaining to the amount (or percentage) of a fuel purchase that may be reimbursed upon exercising a fuel offering for a specified purchase volume of gas (N) begins with a Purchaser attempting to exercise a fuel offering on a purchase of (N) gallons of fuel 905. In response to the Purchaser's attempt to exercise the offering on (N) gallons, the Purchaser's profile may be queried to retrieve associated structural constraint(s), defined herein as (Q) 910. In the embodiment of FIG. 9, this constraint defines a percentage multiplier to be applied to the purchase volume (N) to ascertain a reimbursable volume of fuel (R), as will be described. A determination is made regarding whether the query of the Purchaser's profile yields the structural constraint, that is, does the Purchaser's profile include the structural constraint, i.e., variable (Q). If not, the Purchaser may exercise the offering on (N) gallons of fuel at the basic payout rate 920. Otherwise, a determination is made regarding the amount of fuel (R) that is considered to be reimbursable, in this case, a percentage of the total purchase amount (N) on which the Purchaser desires to exercise the offering on 925. For some embodiments, the determination may be a computation comprising multiplication of the (N) gallons of total fuel purchase by the constraint parameter (Q) to yield a reimbursable volume of fuel (R). Reimbursement is then made to the Purchaser's account based on the volume (R) 930, i.e., the fuel offering is exercised on (R) and not the total purchase (N). In some embodiments, the Purchaser may be notified of the restricted reimbursement 935. Depending on the embodiment, structural constraints may be implemented on a fixed amount per purchase and/or be distributed over the tenor of a fuel offering in a periodic, quasi-periodic, or non-periodic manner.

Geography

In one embodiment, the Fuel Offering Generator may utilize single price zones (SPZs) in determining a price matrix, strike price and/or premium of a fuel offering. SPZs may define, for example, a geographic area and/or other grouping, such as certain station groups, station brands and/or the like, in which a fuel offering may be exercised (i.e., where the fuel offering Purchaser may get his or her selected amount of fuel at the single, preset price).

Figure 10:
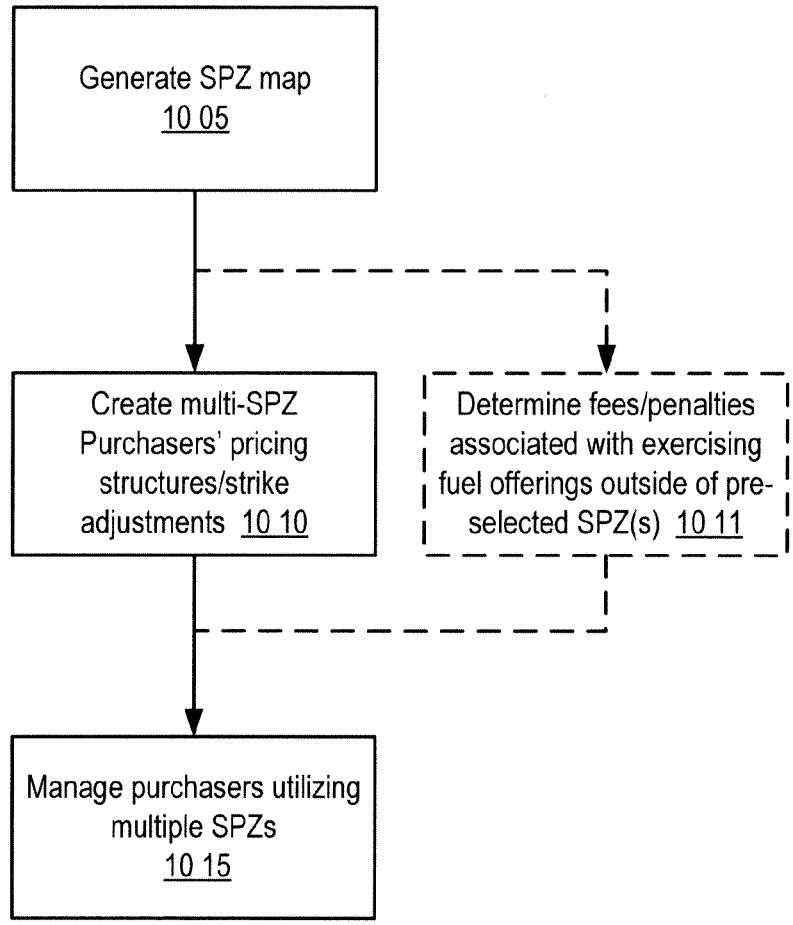
FIG. 10 illustrates one embodiment of SPZ map generation.
Figure 10:
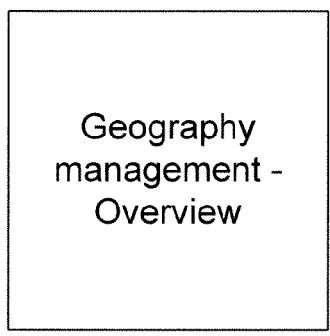

In one embodiment, as shown in FIG. 10, the Fuel Offering Generator may generate an SPZ map 1005. In certain embodiments, a fuel offering may be restricted to only one SPZ. In another embodiment, the exercise of the fuel offering may be restricted to multiple, pre-selected SPZ(s), i.e., the Purchaser selects one or more SPZs when purchasing the fuel offering, and can only exercise the fuel offering within the identified SPZ(s). In an alternative embodiment, the Purchaser may be allowed to exercise the fuel offering outside of the single or multiple pre-selected SPZ(s), but doing so may be associated with an additional fee/penalty. Based on the SPZ map (and associated price matrix data), the Fuel Offering Generator may create pricing structures and/or strike adjustments for multi-SPZ Purchasers 1010. Alternatively, or additionally, the Fuel Offering Generator may determine fees/penalties for exercising fuel offerings outside of the pre-selected SPZ(s) 1011. In one embodiment, the pricing structures, strike adjustments and/or fees/penalties are fixed at purchase (e.g., a Purchaser buys a fuel offering for SPZ1 and locks in an adjustment of $0.25 per gallon for SPZ2 for purchases, if any, in SPZ2). In another embodiment, the pricing structures, strike adjustments and/or fees/penalties may be floating and/or variable until the time of exercise. The Fuel Offering Generator may also manage Purchasers' utilization of SPZs 1015, including managing Purchasers' pricing structures, strike adjustments and/or fees/penalties.

Figure 11:
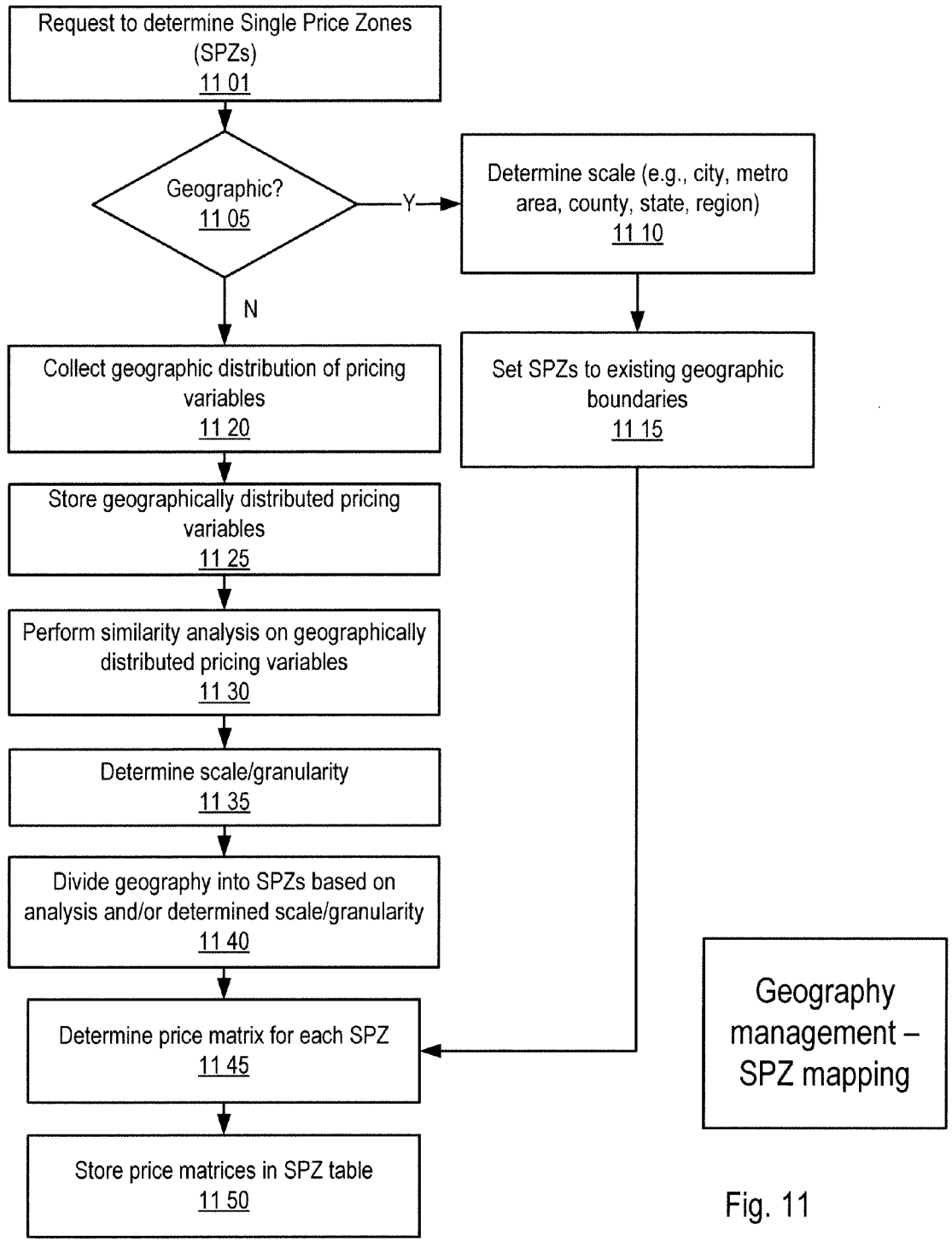
FIG. 11 illustrates further aspects of SPZ map generation and management in one embodiment.

FIG. 11 provides additional detail regarding SPZ mapping and management for an embodiment of the Fuel Offering Generator. Upon receiving a request to determine SPZs 1101, the Fuel Offering Generator may determine if the SPZs are to be set to existing geographic boundaries 1105. If the SPZs are to be set to existing geographic boundaries 1105, the Fuel Offering Generator determines what scale (e.g., city, county, metropolitan area, state and/or region) for setting the boundaries is appropriate 1110. In one embodiment, the size of the SPZ may be particularly relevant in pricing associated fuel offerings, for example, the fuel offering for a large SPZ may be relatively expensive due to adverse selection and/or moral hazard issues due to a larger distribution and/or geographic area. Similarly, in one embodiment, the Fuel Offering Generator may determine SPZs to minimize excluding or "shutting out" potential Purchasers, for example, Purchasers in upstate New York may prefer a fuel offering in which geographic SPZ determination is based on county, rather than state. The Fuel Offering Generator may also account for other issues in determining SPZs, such as the smaller the SPZ, the more restrictive the fuel offering and/or the more complicated the adjustments needed to use the fuel offering products across SPZs. Based on such information, the Fuel Offering Generator may then set the boundaries of the SPZs to the appropriate existing geographic boundaries 1115. While some embodiments may set SPZs according to one scale, other embodiments may combine scales in constructing SPZs (e.g., one SPZ's boundary may be set to a city, while another SPZ's boundary is set to a state). The Fuel Offering Generator may then determine the price matrix for each SPZ 1145 and store the price matrices in a SPZ table 1150.

If the SPZs are not to be set to existing geographic boundaries 1105, the Fuel Offering Generator collects 1120 and stores 1125 a geographic distribution of pricing variables. The Fuel Offering Generator may then perform a similarity analysis on the geographically distributed pricing variables 1130 and, as described previously, determine the scale or granularity with which the SPZ divisions will be set 1135. The Fuel Offering Generator may then assign SPZs according to the similarity analysis and/or determined granularity 1140. In a further embodiment, the assigned geographic boundaries may include, but are not limited to, existing geographic boundaries. The Fuel Offering Generator then determines the price matrix for each SPZ 1145 and stores the price matrices in an SPZ table 1150.

Figure 12:
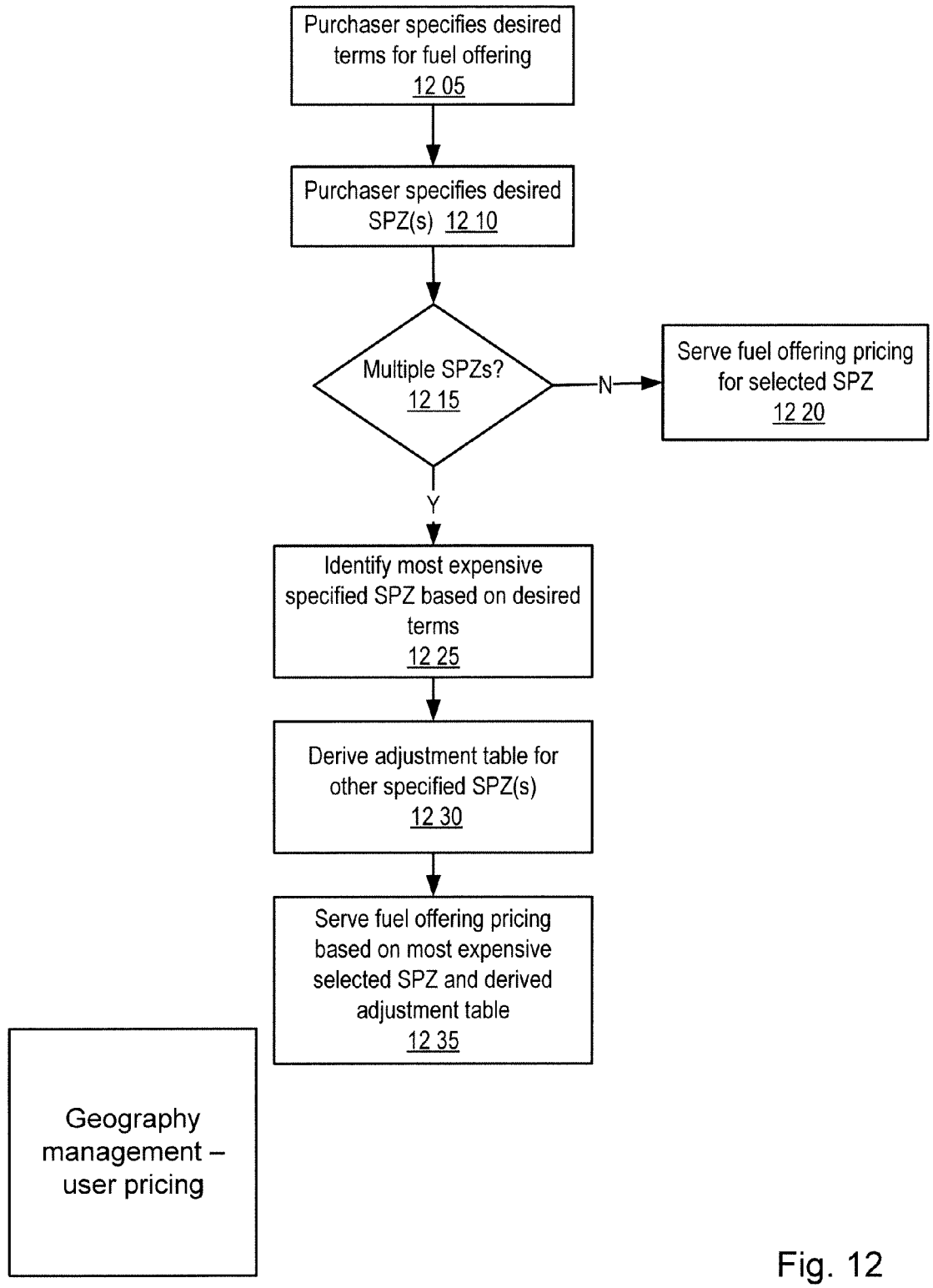
FIG. 12 illustrates aspects of SPZ pricing in one embodiment.

FIG. 12 provides additional detail regarding the SPZ pricing aspect of an embodiment of Fuel Offering Generator. A Purchaser interacts with the Fuel Offering Generator and specifies desired terms for a fuel offering 1205. The Purchaser then specifies one or more SPZs in which they want the ability to exercise the fuel offering 1210. The Fuel Offering Generator then determines is the Purchaser has specified multiple SPZs 1215, and if not, serves the fuel offering pricing based for the desired terms and selected SPZ 1220. In one embodiment, if the Purchaser has specified multiple SPZs 1215, the Fuel Offering Generator identifies the most expensive SPZ of the multiple SPZs based on the desired terms 1225 and derives an adjustment table (e.g., a strike adjustment table) for the other specified SPZs 1230. In other embodiments, the Fuel Offering Generator may derive an adjustment table for a Purchaser's primary SPZ (e.g., the Purchaser's default location, most traveled location, and/or the like), with credits for exercising fuel offerings in relatively cheaper SPZs and debits or penalties for exercising in relatively more expensive SPZs.

The Fuel Offering Generator may then serve the fuel offering pricing based on the most expensive selected SPZ and the derived adjustment table for the Purchaser's desired terms 1235.

Figure 13A:
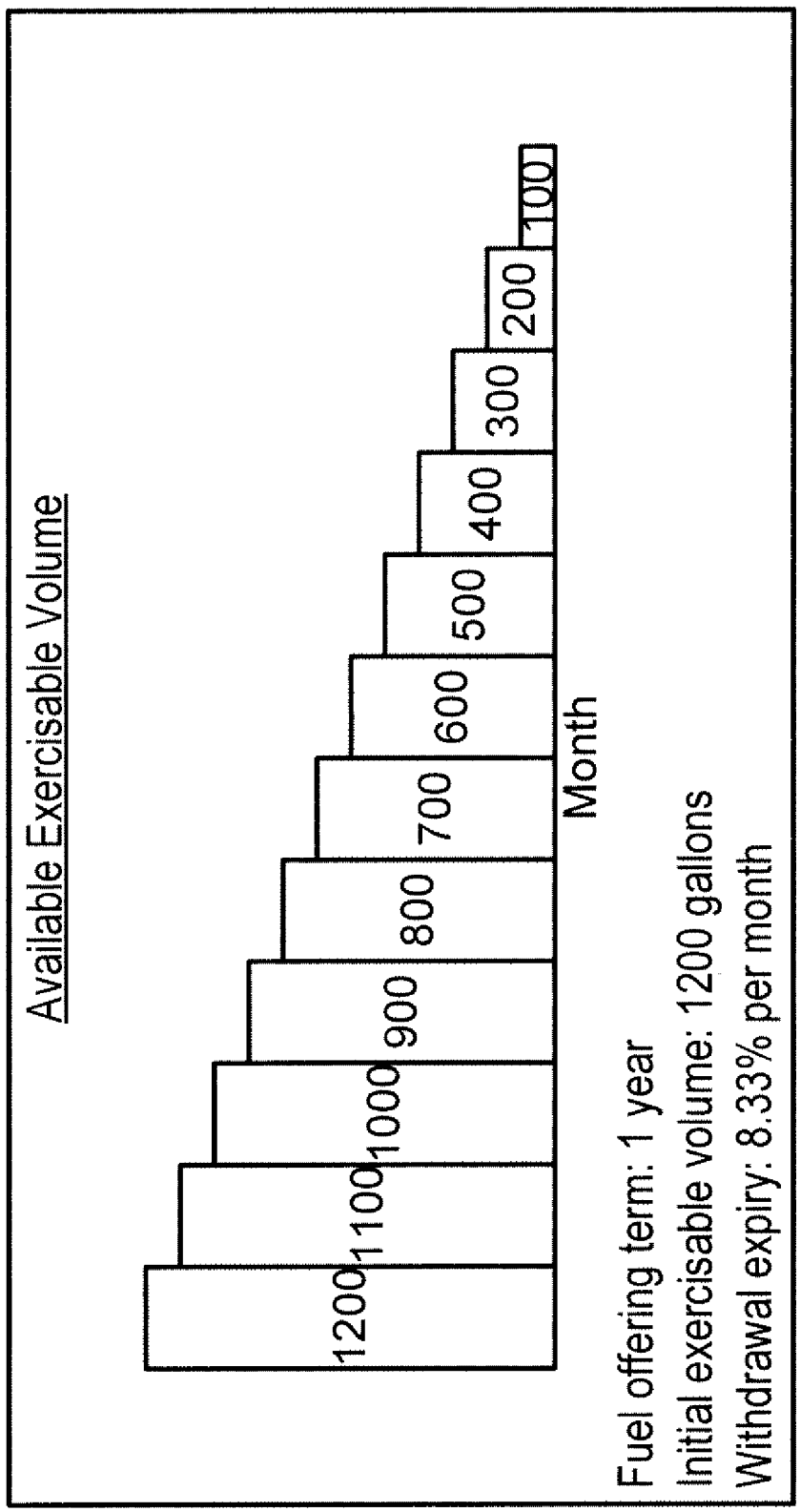
FIGS. 13A-B illustrate aspects of withdrawal expiry restrictions on offerings in one embodiment.

Moving momentarily back to the topic of restrictions and constraints, in some embodiments, the Fuel Offering Generator may provide fuel offerings that in which there is a withdrawal expiry, i.e., a certain amount or percentage of the initial amount (e.g., initial volume amount of the fuel offering) that must be exercised before a specified time or else be subject to expiration. For example, the specifications of a certain fuel offering may include a particular strike price, a total volume of 1200 gallons, a term of one year, and requirement that the Purchaser must exercise at least 8.33% (i.e., purchase at least 100 gallons) each month or else lose the difference. In one embodiment, the withdrawal expiry is set uniformly, for example, if the term of the fuel offering is one year, and the length of a sub-period is one month, 8.33% of the initial total of the fuel offering must be exercised by the end of each month or be subject to expiration, while in another embodiment, the withdrawal expiry could be non-uniform. FIG. 13A illustrates the available exercise volume per month for a fuel offering with a term of one year, an initial exercisable volume of 1200 gallons, and a withdrawal expiry of 8.33% (100 gallons) per month. As can be seen in the figure, the Purchaser may exercise any or all of the 1200 gallons in the first month, but only a maximum of 100 gallons by the last month.

In one implementation, the required exercise could be based on a cumulative amount, for example, in the situation described above, if a Purchaser exercised 20% in the first month and only 1% in the second month, no part of the fuel offering would be subject to expiration (i.e., 20%+1% is greater than 8.33%+8.33%). Alternatively, in another implementation, the withdrawal expiry could be periodic, so that either a certain percentage of the initial or remaining amount must be exercised each period or be subject to expiration. In one embodiment, the Purchaser may exercise the entire remaining (i.e., non-expired) amount of the fuel offering, while in another embodiment, the fuel offering may also be subject to usage caps.

Figure 13B:
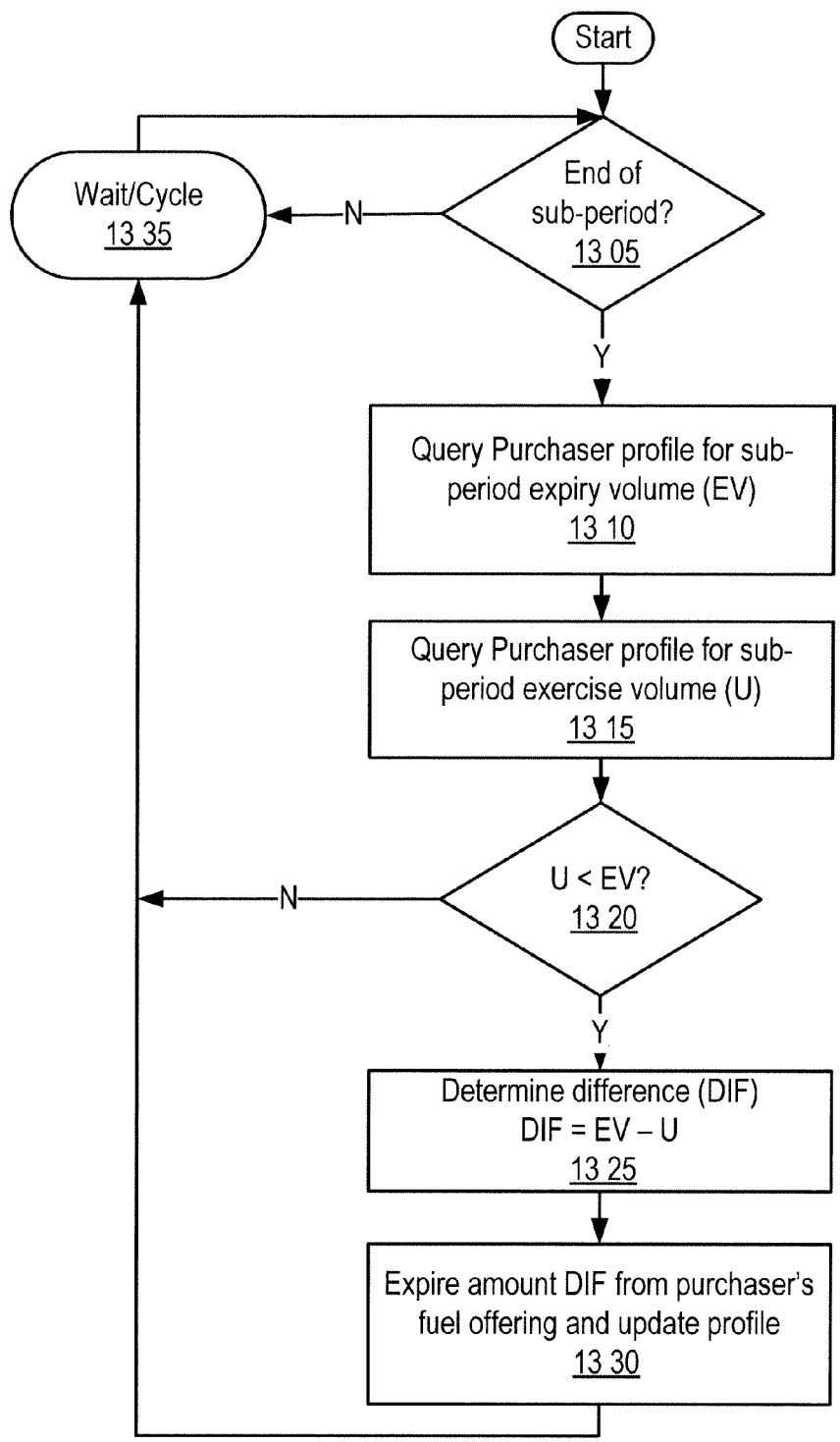

FIG. 13B provides additional detail for the withdrawal expiry aspect of one embodiment of the Fuel Offering Generator. After generation of the fuel offering, the Fuel Offering Generator checks whether it is the end of the specified sub-period 1305, and if it is not, cycles/waits 1335 and re-checks 1305. If it is the end of the specified sub-period 1305, the Fuel Offering Generator queries the Purchaser profile for the specified sub-period expiry volume 1310 and the Purchaser's sub-period exercise volume 1315. If the Purchaser's sub-period exercise volume is greater than or equal to the specified sub-period expiry volume 1320, then no part of the Purchaser's fuel offering expires and the Fuel Offering Generator waits for the end of the next period 1335. However, if the Purchaser's sub-period exercise volume is less the specified sub-period expiry volume 1320, then the Fuel Offering Generator determines the difference between the sub-period expiry volume and the sub-period exercise volume 1325 and expires that amount from the Purchaser's fuel offering, updates the Purchaser's profile 1330, and waits for the end of the next sub-period 1335. In one embodiment, if the Purchaser prepaid the strike price, the strike price for the expired amount may be returned (but not the premium). Alternatively, some embodiments do not return the prepaid strike price.

Figure 14:
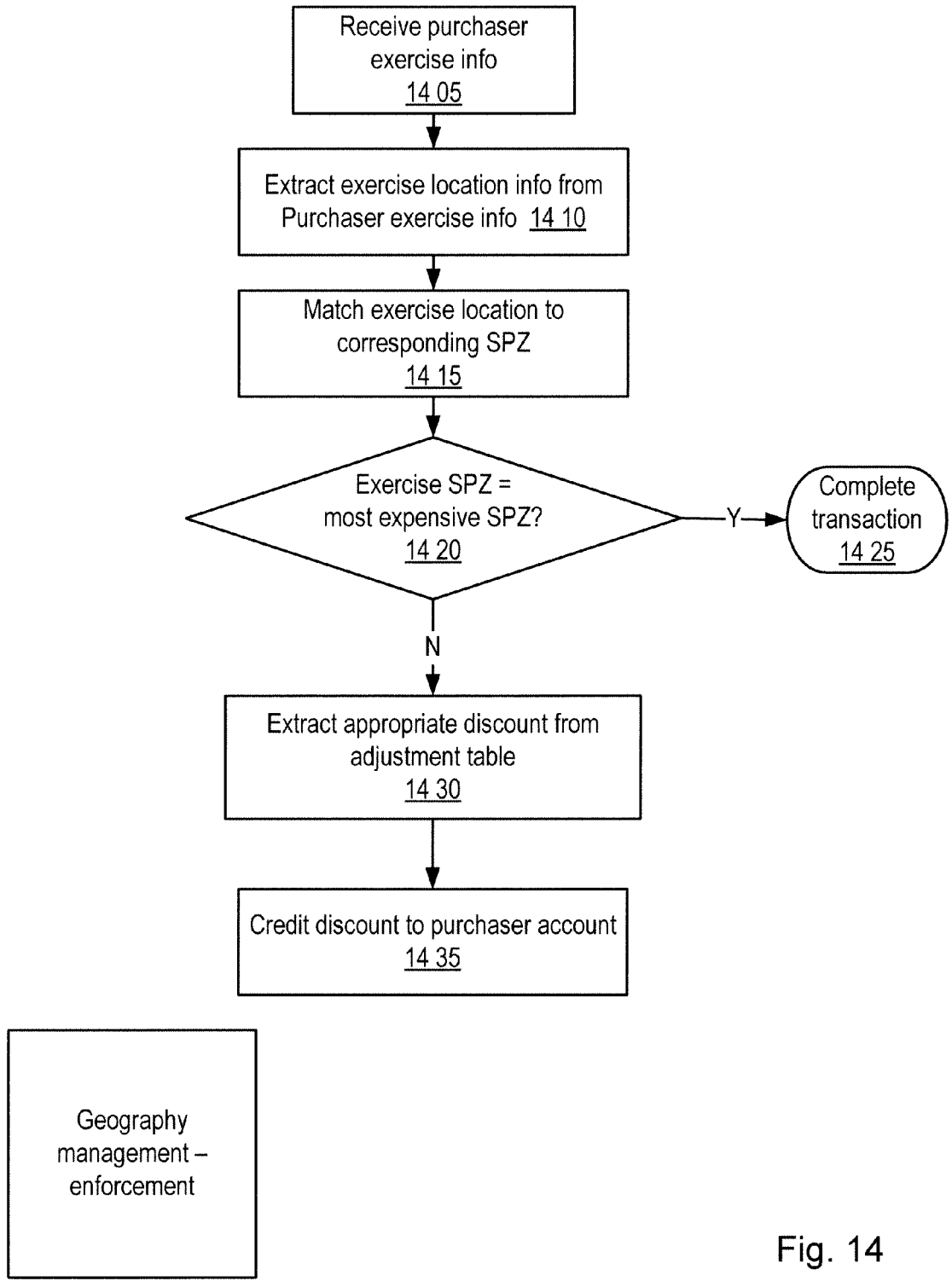
FIG. 14 shows an overview of one aspect of the multi-SPZ fuel offering exercise in one embodiment.

Returning to the topic of geography, FIG. 14 provides an overview of one aspect of the multi-SPZ fuel offering exercise in an embodiment of the Fuel Offering Generator. The Fuel Offering Generator receives Purchaser exercise information for a fuel offering 1405, for example, in one implementation, via an electronic credit transaction. The Fuel Offering Generator may then determine or extract from the exercise information the location information (e.g., address of the gas station) where the Purchaser exercised the fuel offering 1410, and matches the location to the corresponding SPZ 1415. If the SPZ corresponding to the exercise location information is also the most expensive SPZ of the Purchaser's specified SPZs 1420, then the transaction is completed 1425. If the SPZ is not the most expensive SPZ of the Purchaser's specified SPZs 1420, the Fuel Offering Generator extracts the appropriate discount from the Adjustment Table 1430 and credits the Purchaser's account 1435. In a further embodiment, an adjustment table may also include penalties that could be charged to a Purchaser for exercising the fuel offering outside of a pre-selected SPZ (if allowed by the Fuel Offering Generator).

In one embodiment, the adjustment table is a strike adjustment table indicating the refund or rebate the Purchaser would receive if they exercised the fuel offering in one of the selected SPZs which was not the most expensive SPZ. For example, if a Purchaser selects a fuel offering with two SPZs, Manhattan and Pittsburgh, and the Manhattan SPZ is the most expensive, the Purchaser would pay for fuel offering based on the Manhattan indicated price. However, if the strike adjustment table indicated an adjustment of $0.10 for Pittsburgh, and the Purchaser exercised the fuel offering in Pittsburgh, the Purchaser may receive a corresponding credit or rebate for exercising the fuel offering in the less expensive SPZ.

Purchaser Behavior

Figure 15:
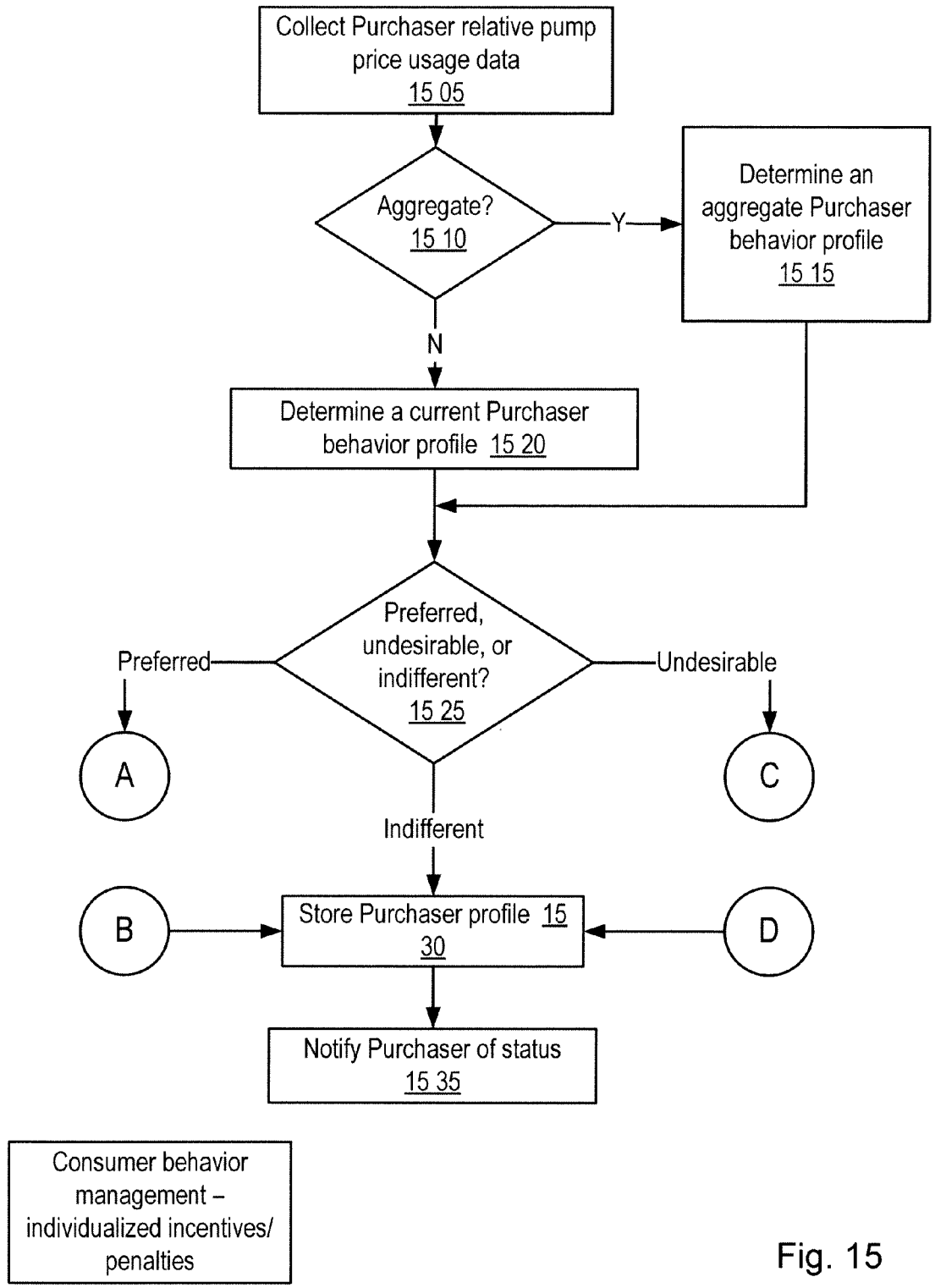
FIG. 15 illustrates aspects of process flow for management of Purchaser profile incentives and/or penalties in one embodiment.

FIGS. 15 through 18 illustrate the process flow for one aspect of Purchaser behavior management in an embodiment of the Fuel Offering Generator. As shown in FIG. 15, the Fuel Offering Generator may collect relative pump price usage data for a Purchaser 1505 (for example, the pump price at which the Purchaser exercises one or more fuel offerings relative to the pump price at which other Purchasers with like characteristics, such as location and/or similar fuel offerings, exercise fuel offerings). Alternatively, or additionally, other Purchaser behavior data such as the relative time-from-purchase-to-exercise of fuel offerings, suboptimal exercise traits (e.g., whether the Purchaser typically exercises the fuel offering suboptimally, and if so, if said exercise is pre-optimal and/or post-optimal), and/or the like, as well as Purchaser characteristics (e.g., demographic information) may also be collected. Depending on the implementation, the above data may be collected periodically and/or continuously. In some embodiments, the collected data for multiple Purchasers may be amassed and marketing and behavior analyses performed to identify relevant trends and characteristics of Purchasers, including data regarding adverse selection (e.g., within a particular SPZ, if there is more interest in fuel offerings among Purchaser's who typically pay higher prices) and/or moral hazard information (e.g., if Purchaser's start frequenting more expensive fuel retailers after purchase of fuel offerings).

The Fuel Offering Generator may utilize the collected data to characterize a Purchaser, and the characterization may be based on the Purchaser's current information and/or aggregate information. If the characterization is based on aggregate information 1510, the Fuel Offering Generator determines an aggregate Purchaser behavior profile 1515, while if the characterization is based on current Purchaser information 1510, the Fuel Offering Generator determines a current Purchaser behavior profile 1520. Based on the Purchaser behavior profile, the Purchaser may be grouped, rated and/or otherwise identified, where such identification is used in optimizing subsequent interactions with the Purchaser. For example, as shown in the figure, in one embodiment, the Purchaser may be identified as preferred, undesirable, or indifferent 1525. In one implementation, the grouping may reflect the relative value the Purchaser represents (e.g., profitable, unprofitable, or break-even, respectively). The identification may be stored in the Purchasers profile 1530, and in some embodiments, the Purchaser may be notified of their associated status and/or associated incentives or penalties (as described below in FIGS. 16, 17 and 18).

Figure 16:
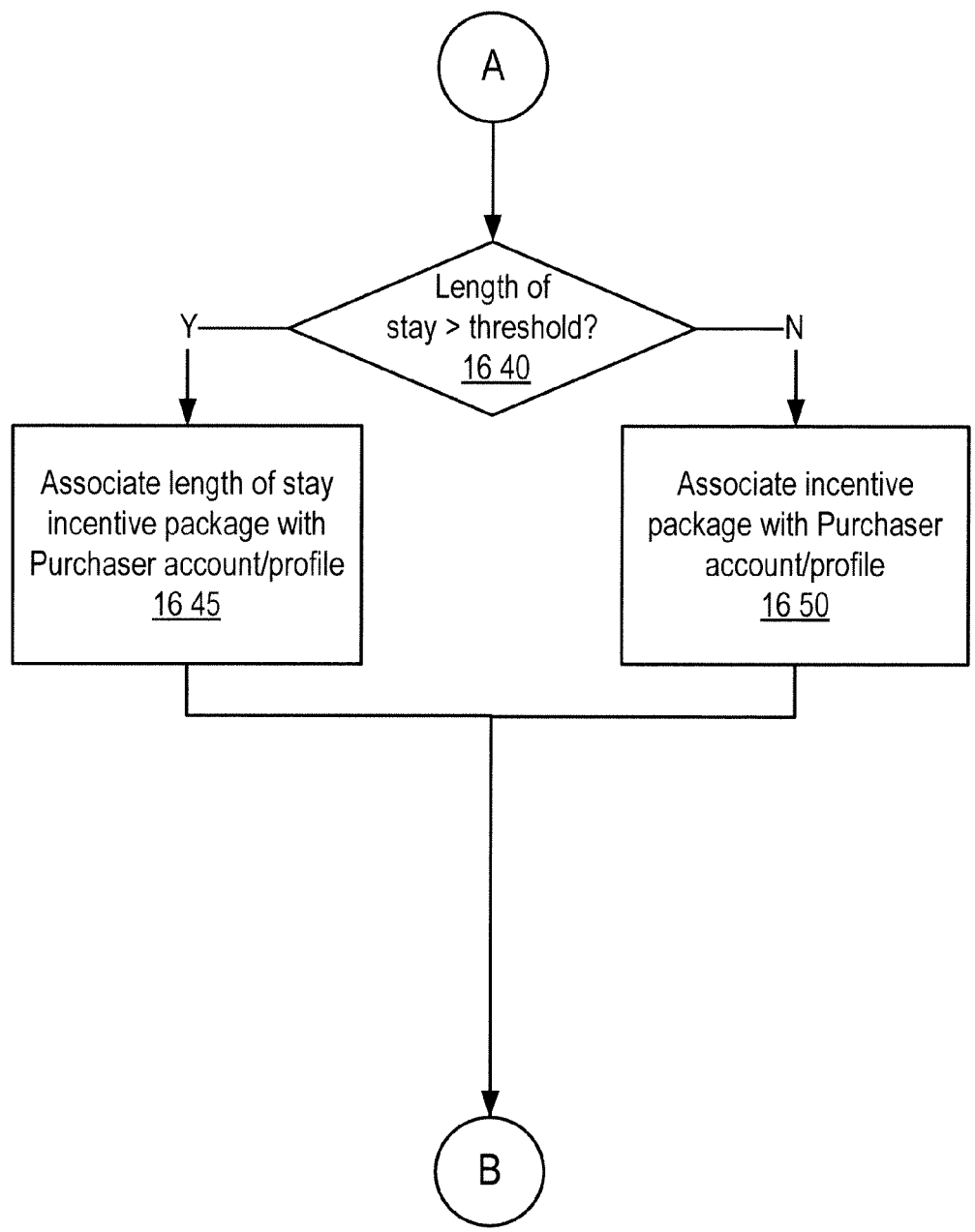
FIG. 16 illustrates further aspects of process flow for management of Purchaser profile incentives and/or penalties in one embodiment.

As shown in FIG. 16, in one embodiment, if the Purchaser is preferred, the Fuel Offering Generator may determine if the Purchaser's length of stay (i.e., the time the Purchaser has had a relationship with the Fuel Offering Generator and/or associated entities) is greater than a certain threshold 1640, the Fuel Offering Generator may associate a length of stay incentive package (such as discounts, rebates, and/or the like) with the Purchaser's account and/or profile 1645. If the Purchaser's length of stay is not greater than a certain threshold 1640, the Fuel Offering Generator may associate another style of incentive package with the Purchaser's account and/or profile 1650. Depending on the Purchaser characteristics, rewards or incentives may be directed to retain Purchasers, encourage increased use and/or acquisition of fuel offerings, and/or otherwise encourage or modify future Purchaser behavior.

Figure 17:
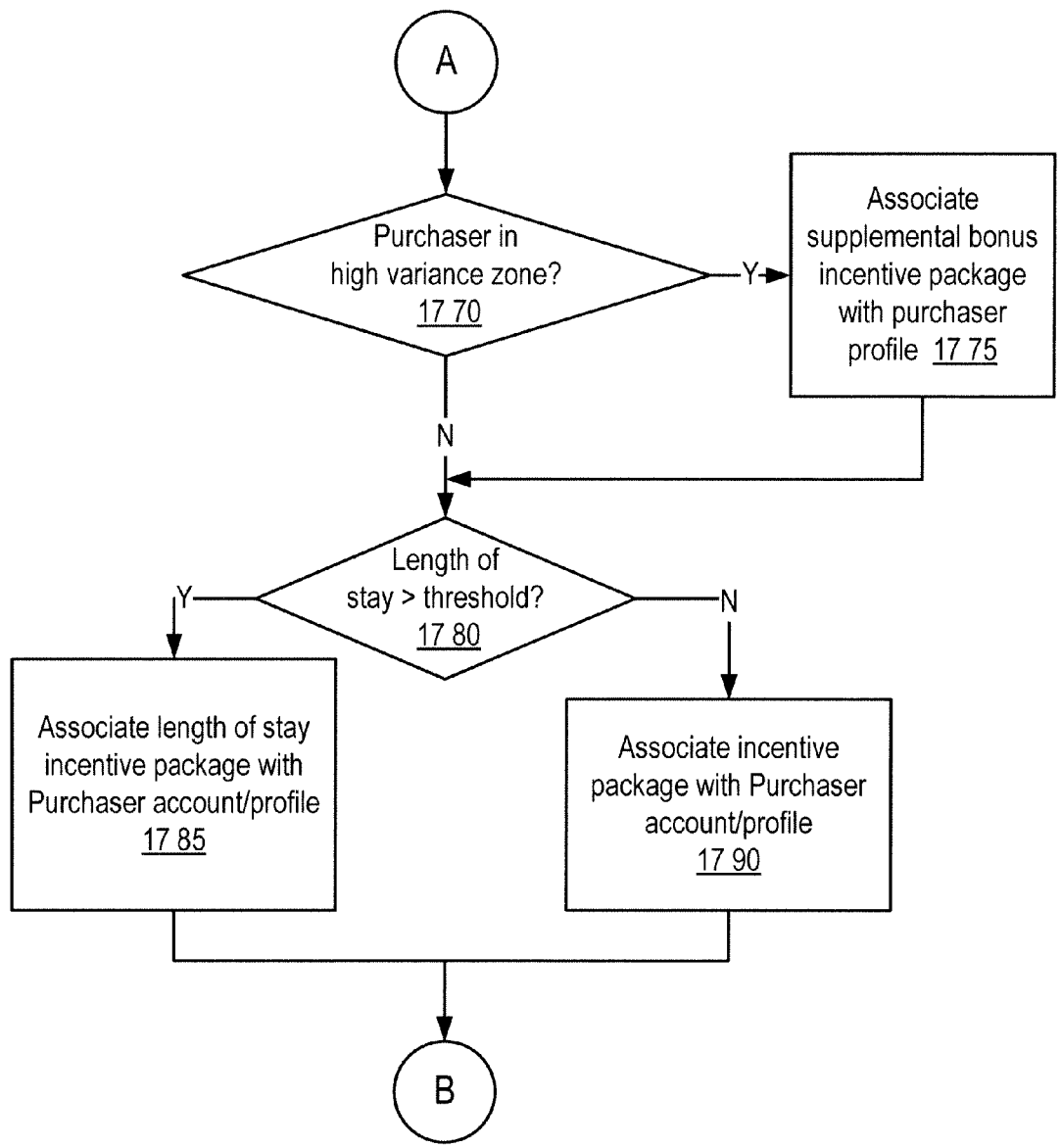
FIG. 17 illustrates further aspects of process flow for management of Purchaser profile incentives and/or penalties in one embodiment.

Similarly, FIG. 17 shows Purchaser incentive structures 1780, 1785, 1790 related to those shown in FIG. 16 (1640, 1645, 1650, respectively), and further illustrates an embodiment in which the Fuel Offering Generator determines if the Purchaser is in a high variance zone 1770 (e.g., Purchaser could be exercising fuel offerings at relatively expensive gas stations, but is not doing so as indicated by their preferred status), and if so, associating a supplemental bonus incentive package with the Purchaser's account and/or profile 1775 (e.g., a package that reinforces/rewards positive Purchaser behavior).

Figure 18:
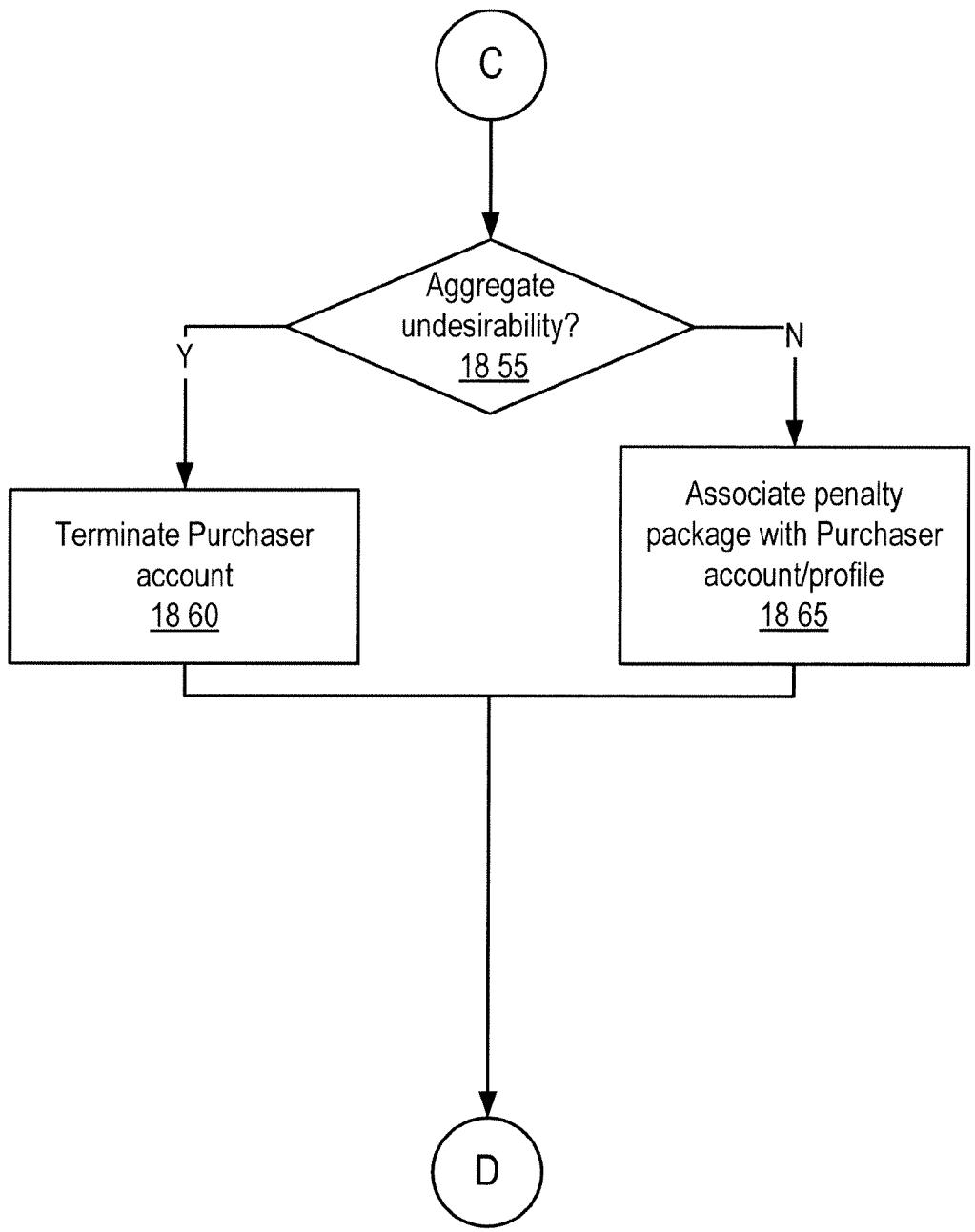
FIG. 18 illustrates further aspects of process flow for management of Purchaser profile incentives and/or penalties in one embodiment.

Alternatively, if the Purchaser is undesirable 1525, in one embodiment, as shown in FIG. 18, the Fuel Offering Generator may determine if the Purchaser represents aggregate undesirability 1855 (e.g., the Purchaser has been undesirable for a significant portion of the relationship between the Purchaser with the Fuel Offering Generator and/or associated entities), and if so, may terminate the Purchaser's account and/or not provide the Purchaser with additional fuel offerings. If the Fuel Offering Generator determines the Purchaser does not have aggregate undesirability 1855, a penalty package (or an incentive package that directs the Purchaser towards preferred behaviors) may be associated with the Purchaser's profile and/or account 1865.

Figure 19:
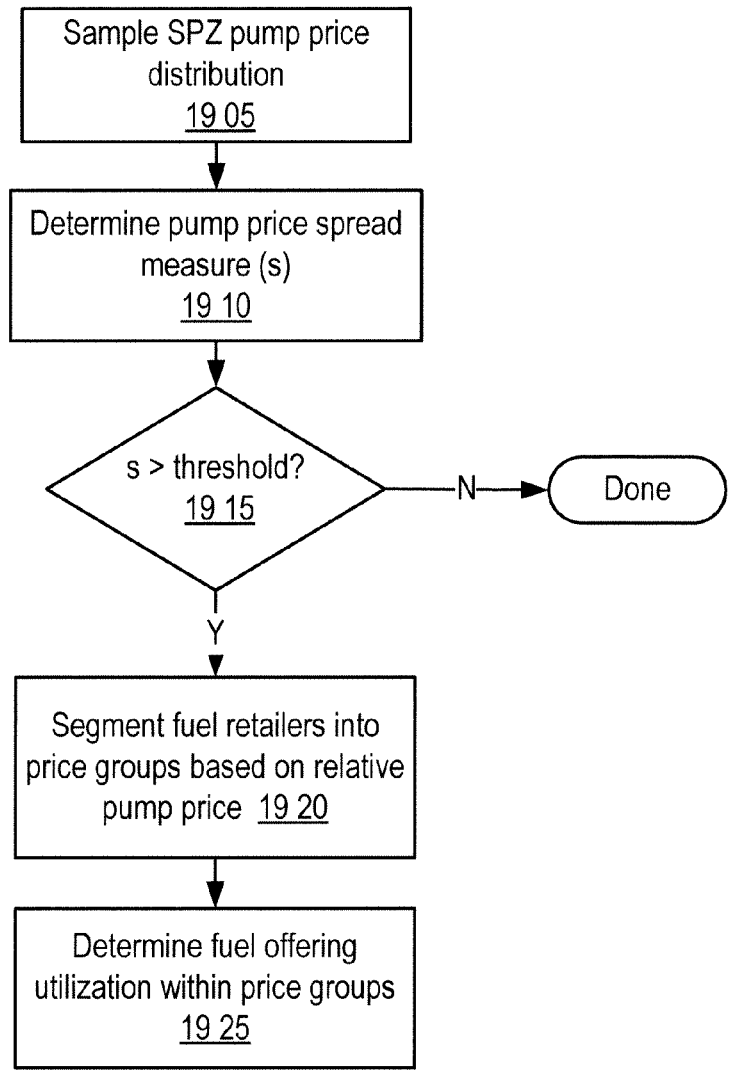
FIG. 19 illustrates aspects of process flow for management of retailer price group incentives and/or penalties in one embodiment.

FIG. 19 illustrates the process flow for one aspect of Purchaser behavior management in one embodiment of the Fuel Offering Generator. The Fuel Offering Generator may sample an SPZ pump price distribution 1905 in order to extract therefrom one or more statistical quantities characterizing fuel retailers within the SPZ. In one implementation, the Generator samples pump prices across all retailers within an SPZ, while in another implementation the Generator samples pump prices from some representative subset of fuel retailers within the SPZ. In still another embodiment, the Generator may sample pump prices across a subset of retailers in the SPZ that excludes one or more non-participating fuel retailers from consideration. The Generator may determine a measure of pump price spread ($\sigma$) 1910, such as a standard deviation, variance, and/or the like. A determination is made 1915 as to whether this pump price spread measure exceeds a pre-established threshold, and if not, then the process of FIG. 19 completes with no further action. Otherwise, if the pump price spread measure exceeds the threshold 1915, then fuel retailers in the SPZ may be segmented into a plurality of price groups based on the relation of their pump prices to the average pump price 1920. For example, fuel retailers may be segmented and/or grouped based on the number of standard deviations away from the mean pump price that their pump prices fall. In one implementation, a fuel retailer's current pump price is considered, while in another implementation the fuel retailer's pump price averaged over some period of time is considered. In some embodiments, the segmentation information may be used by the Fuel Offering Generator as an input in determining a price matrix and/or in constructing an appropriate hedging strategy. Based on this segmentation, the Generator may incentivize or penalize Purchaser solicitation of particular fuel retailers 1925. In some embodiments, incentives and/or penalties may be provided and/or assessed immediately (i.e., communicated to Purchaser's to directly influence behavior), while in a further embodiment, such incentives and/or penalties may take the form of modified premiums, price adjustments and/or restrictions associated with subsequent fuel offerings.

Figure 20:
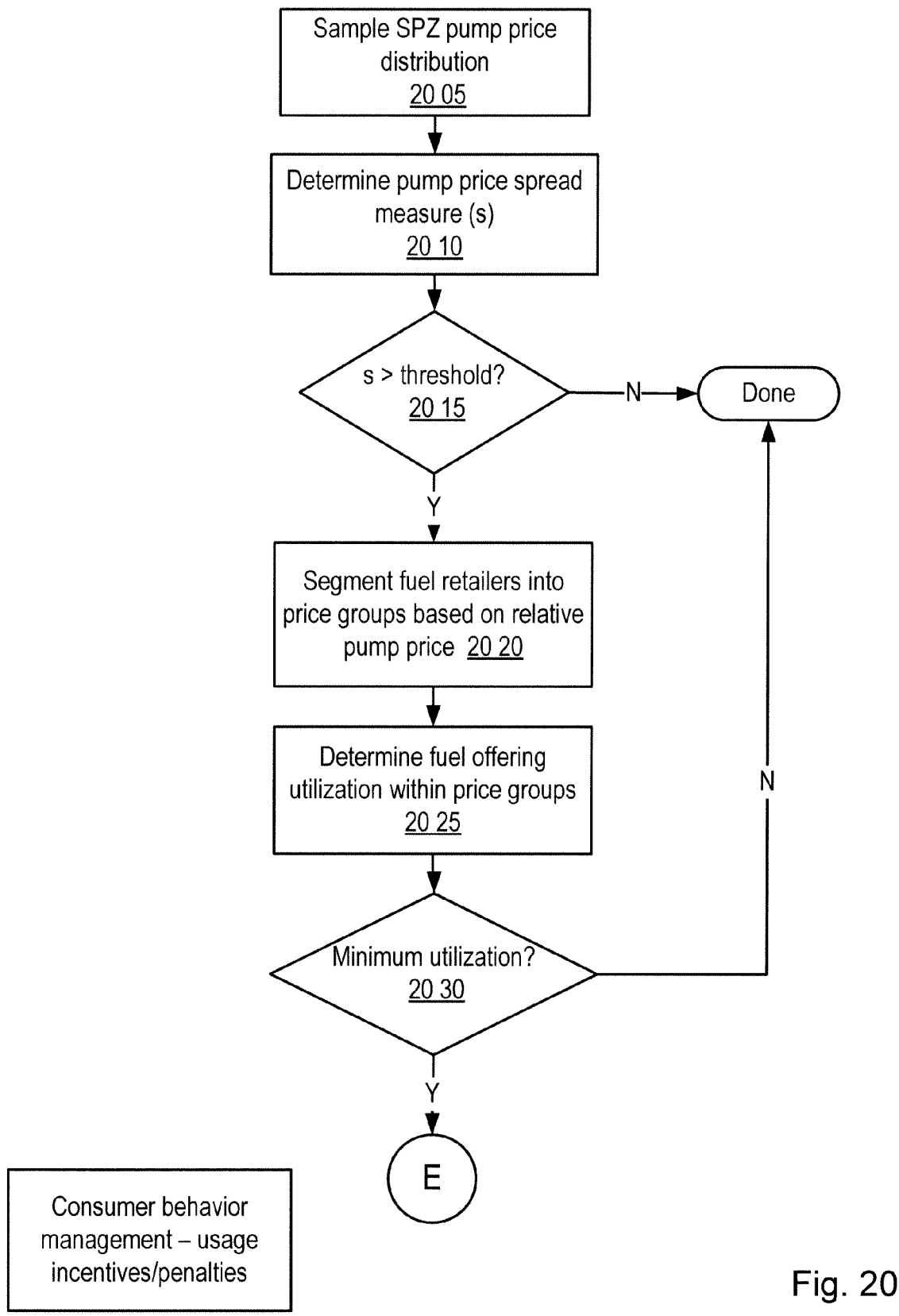
FIG. 20 illustrates further aspects of process flow for management of retailer price group incentives and/or penalties in one embodiment.

FIG. 20 illustrates an aspect of fuel retailer incentivizing for some embodiments of the Fuel Offering Generator. The Fuel Offering Generator samples SPZ pump price distribution 2005 for one or more statistical quantities characterizing fuel retailers within the SPZ, in one embodiment in the process as described in FIG. 19. The Fuel Offering Generator may determine a measure of pump price spread ($\sigma$) 2010, such as a standard deviation, variance, and/or the like, and a determination is made 2015 as to whether this pump price spread measure exceeds a pre-established threshold, and if not, then the process of FIG. 20 completes with no further action. Otherwise, if the pump price spread measure exceeds the threshold 2015, the Fuel Offering Generator segments fuel retailers in the SPZ into a plurality of price groups based on the relation of their pump prices to the average pump price 2020, similar to FIG. 19 above. The Fuel Offering Generator then determines the fuel offering utilization within and/or across the price groups 2025 and identifies if, for a particular price group and/or specific fuel retailer(s) within the price group, there is minimum utilization by Purchasers 2030 (i.e., most Purchasers are not exercising their fuel offering(s)s at the fuel retailers within the price group). In some embodiments, information regarding fuel offering utilization within and/or across the price groups may be used by the Fuel Offering Generator as an input in determining a price matrix and/or in constructing an appropriate hedging strategy.

Figure 21:
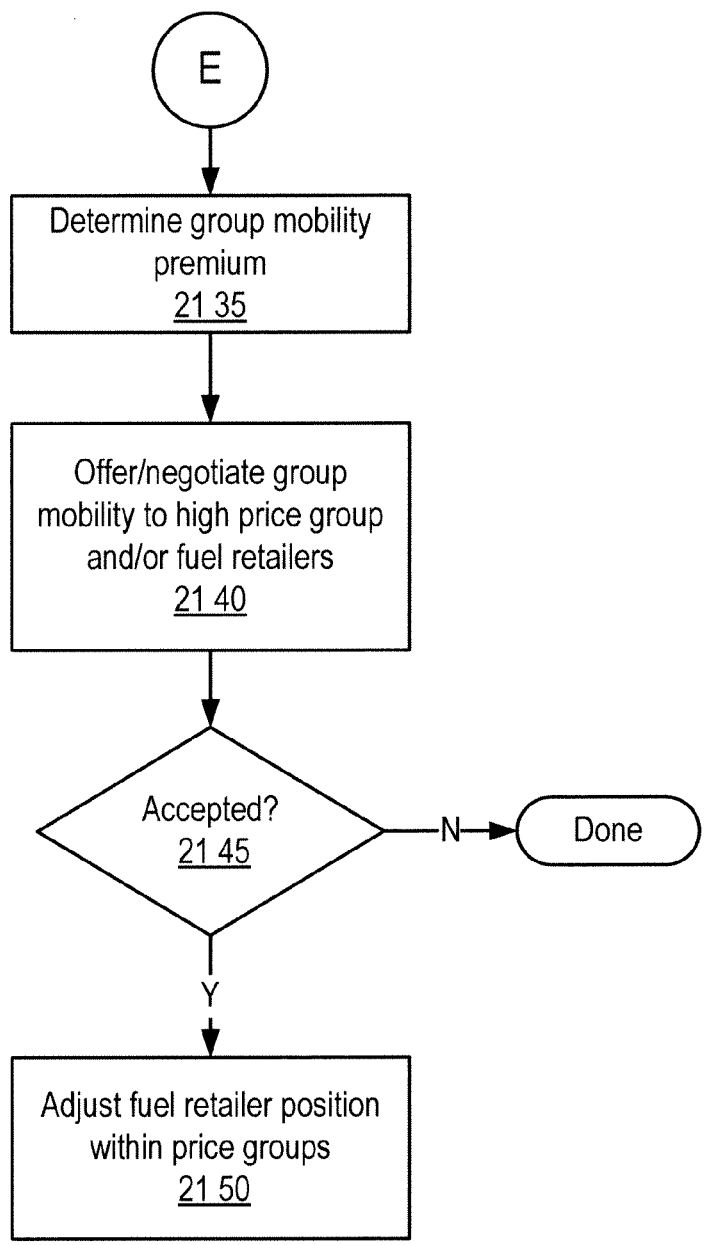
FIG. 21 illustrates further aspects of process flow for management of retailer price group incentives and/or penalties in one embodiment.

If there is not minimum utilization 2030, in particular, if there is not minimum utilization of the more expensive fuel retailers by Purchasers, the Fuel Offering Generator does not continue the process of FIG. 20, and in a further embodiment, the Fuel Offering Generator may reassess associated pricing, incentives, penalties, premiums, price adjustments and/or restrictions, for example, as described in FIG. 19. If there is minimum utilization of a price group and/or particular fuel retailer(s) by Purchasers 2030, as shown in FIG. 21, the Fuel Offering Generator may determine the group mobility premium 2135. In one embodiment, the group mobility premium represents the value that inclusion in another price group (and the associated increase in Purchaser solicitation) represents to the fuel retailer(s), while in another embodiment the group mobility premium represents the cost of allowing and/or not disincentivizing Purchaser solicitation of the fuel retailer(s). In yet another embodiment, the group mobility premium represents the value that Purchasers place on having access to the particular price group and/or fuel retailer(s). The group mobility premium may, in some embodiments, by utilized by the Fuel Offering Generator as an input in determining a price matrix and/or in constructing an appropriate hedging strategy. In one embodiment, the Fuel Offering Generator and/or associated entities may utilize the group mobility premium in offering or negotiating group mobility (e.g., the removal of restrictions and/or penalties to allow fuel retailers access to Purchasers) with one or more fuel retailers. This may be particular attractive to fuel retailers with relatively high pump prices (such as premium gas stations or conveniently located retailers) in that it allows for segmentation of customers and/or de facto price discrimination. For example, in one embodiment, a gas station could continue to charge a relatively high pump price to typical customers, while also gaining access to the solicitation of Purchasers. If the fuel retailer accepts the offer and associated group mobility premium 2145, the Fuel Offering Generator adjusts the fuel retailer's position within the price groups 2150. In one embodiment the group mobility premium could be paid by the fuel retailer to the Fuel Offering Generator (and/or associated entities) as a one time and/or periodic fee. In another embodiment, the group mobility premium could consist of and/or further include a revenue and/or risk sharing agreement, with pricing adjustment and/or payments from the fuel retailer to the Fuel Offering Generator (and/or associated entities) and/or vice versa. In yet another embodiment, said pricing adjustments and/or payments could be made from the fuel retailer and/or Fuel Offering Generator (and/or associated entities) to the Purchaser, as necessary. In some embodiments, the group mobility premium and associated arrangements may be used by the Fuel Offering Generator as an input in determining a price matrix and/or in constructing an appropriate hedging strategy.

Fuel Offering Generator System Controller

Figure 22:
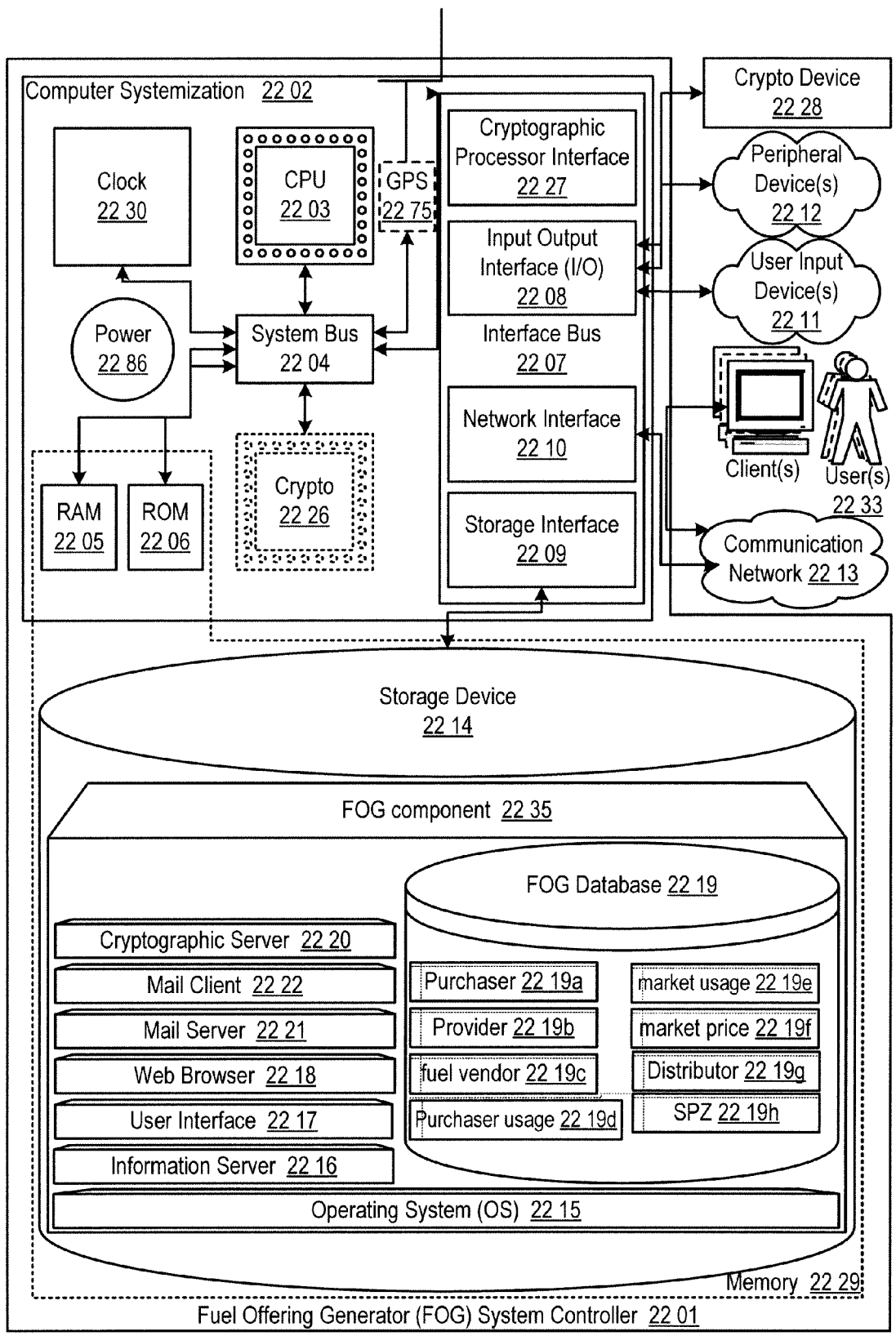
FIG. 22 is of a block diagram illustrating embodiments of the present invention of a Fuel Offering Generator system controller.

FIG. 22 of the present disclosure illustrates inventive aspects of an Fuel Offering Generator controller 2201 in a block diagram. In this embodiment, the Fuel Offering Generator controller 2201 may serve to aggregate, process, store, search, serve, identify, instruct, generate, match, and/or facilitate comparative interactions with information, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the Fuel Offering Generator system controller 2201 may be connected to and/or communicate with entities such as, but not limited to: one or more users from user input devices 2211; peripheral devices 2212; a cryptographic processor device 2228; and/or a communications network 2213.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Fuel Offering Generator system controller 2201 may be based on common computer systems that may comprise, but are not limited to, components such as: a computer systemization 2202 connected to memory 2229.

Computer Systemization

A computer systemization 2202 may comprise a clock 2230, central processing unit (CPU) 2203, a read only memory (ROM) 2206, a random access memory (RAM) 2205, and/or an interface bus 2207, and most frequently, although not necessarily, are all interconnected and/or communicating through a system bus 2204. Optionally, the computer systemization may be connected to an internal power source 2286. Optionally, a cryptographic processor 2226 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Fuel Offering Generator system controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 2286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2286 is connected to at least one of the interconnected subsequent components of the Fuel Offering Generator system thereby providing an electric current to all subsequent components. In one example, the power source 2286 is connected to the system bus component 2204. In an alternative embodiment, an outside power source 2286 is provided through a connection across the I/O 2208 interface. For example, a USB and/or IEEE 1394 connection carries both data and power across the connection and is therefore a suitable source of power.

Interface Adapters

Interface bus(ses) 2207 may accept, connect, and/or communicate to a number of interface adapters, conventionally although not necessarily in the form of adapter cards, such as but not limited to: input output interfaces (I/O) 2208, storage interfaces 2209, network interfaces 2210, and/or the like. Optionally, cryptographic processor interfaces 2227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2209 may accept, communicate, and/or connect to a number of storage devices such as, but not limited to: storage devices 2214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2210 may accept, communicate, and/or connect to a communications network 2213. Through a communications network 113, the Fuel Offering Generator system controller is accessible through remote clients 2233*b* (e.g., computers with web browsers) by users 2233*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2210 may be used to engage with various communications network types 2213. For example, multiple network interfaces may be employed to allow for the communication over broadcast, multicast, and/or unicast networks.

Input Output interfaces (I/O) 2208 may accept, communicate, and/or connect to user input devices 2211, peripheral devices 2212, cryptographic processor devices 2228, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 2211 may be card readers, dongles, finger print readers, gloves, graphics tablets, joysticks, keyboards, mouse (mice), remote controls, retina readers, trackballs, trackpads, and/or the like.

Peripheral devices 2212 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Fuel Offering Generator system controller may be embodied as an embedded, dedicated, and/or monitor-less (i.e., headless) device, wherein access would be provided over a network interface connection.

Cryptographic units such as, but not limited to, microcontrollers, processors 2226, interfaces 2227, and/or devices 2228 may be attached, and/or communicate with the Fuel Offering Generator system controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 2229. However, memory is a fungible technology and resource, thus, any number of memory embodiments may be employed in lieu of or in concert with one another. It is to be understood that the Fuel Offering Generator system controller and/or a computer systemization may employ various forms of memory 2229. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 2229 will include ROM 2206, RAM 2205, and a storage device 2214. A storage device 2214 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 2229 may contain a collection of program and/or database components and/or data such as, but not limited to: operating system component(s) 2215 (operating system); information server component(s) 2216 (information server); user interface component(s) 2217 (user interface); Web browser component(s) 2218 (Web browser); database(s) 2219; mail server component(s) 2221; mail client component(s) 2222; cryptographic server component(s) 2220 (cryptographic server); the Fuel Offering Generator system component(s) 2235; and/or the like (i.e., collectively a component collection). These components may be stored and accessed from the storage devices and/or from storage devices accessible through an interface bus. Although non-conventional program components such as those in the component collection, typically, are stored in a local storage device 2214, they may also be loaded and/or stored in memory such as: peripheral devices, RAM, remote storage facilities through a communications network, ROM, various forms of memory, and/or the like.

Operating System

The operating system component 2215 is an executable program component facilitating the operation of the Fuel Offering Generator system controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Fuel Offering Generator system controller to communicate with other entities through a communications network 2213. Various communication protocols may be used by the Fuel Offering Generator system controller as a subcarrier transport mechanism for interaction, such as, but not limited to: multicast, TCP/IP, UDP, unicast, and/or the like.

Information Server

An information server component 2216 is a stored program component that is executed by a CPU. The information server may be a conventional Internet information server such as, but not limited to Apache Software Foundation's Apache, Microsoft's Internet Information Server, and/or the. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Fuel Offering Generator system controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Fuel Offering Generator system database 2219, operating systems, other program components, user interfaces, Web browsers, and/or the like.

Access to the Fuel Offering Generator system database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Fuel Offering Generator system. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Fuel Offering Generator system as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 2217 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2218 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Fuel Offering Generator system enabled nodes. The combined application may be nugatory on systems employing standard Web browsers.

Mail Server

A mail server component 2221 is a stored program component that is executed by a CPU 2203. The mail server may be a conventional Internet mail server such as, but not limited to sendmail, Microsoft Exchange, and/or the. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Fuel Offering Generator system.

Access to the Fuel Offering Generator system mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2222 is a stored program component that is executed by a CPU 2203. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2220 is a stored program component that is executed by a CPU 2203, cryptographic processor 2226, cryptographic processor interface 2227, cryptographic processor device 2228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Fuel Offering Generator system may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Fuel Offering Generator system component to engage in secure transactions if so desired. The cryptographic component facilitates the secure accessing of resources on the Fuel Offering Generator system and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Fuel Offering Generator Database

The Fuel Offering Generator database component 2219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Fuel Offering Generator database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Fuel Offering Generator database is implemented as a data-structure, the use of the Fuel Offering Generator database 2219 may be integrated into another component such as the Fuel Offering Generator component 2235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2219 includes several tables 2219*a-i*. A Purchaser table 2219*a* includes fields such as, but not limited to: a user name, email address, address, profile, user_id, and/or the like. A Provider table 2219*b* includes fields such as, but not limited to: a Provider name, email address, address, profile, Provider_id, and/or the like. A fuel vendor table 2219*c* includes fields such as, but not limited to: a fuel vendor name, address, vendor_id, and/or the like. A Purchaser usage table 2219*d* includes fields such as, but not limited to: Purchaser_id, Provider_id, Distributor_id, vendor_id, transaction_id, fuel used, date, fuel purchase price, and/or the like. A market usage table 2219*e* includes fields such as, but not limited to: date, volume, fuel price, and/or the like. A market price table 2219*f* includes fields such as, but not limited to: financial instrument_id, price, and/or the like. A Distributor table 2219*g* includes fields such as, but not limited to: a Distributor name, email address, address, profile, Distributor_id, and/or the like. A single price zone table 2219*h* includes fields such as, but not limited to: spz_id, region zipcode, region bounding (longitude, latitude), region radius, and/or the like. A variables table 2219*i* includes fields such as, but not limited to: current fuel market variables, historical fuel market variables, price matrices, consumer price matrices, sensitivity data, Purchaser behavior data, and/or the like.

In one embodiment, the Fuel Offering Generator system database may interact with other database systems. For example, employing a distributed database system, queries and data access by Fuel Offering Generator system component may treat the combination of the Fuel Offering Generator system database, an integrated data security layer database as a single database entity.

In one embodiment, user programs may contain various user interface primitives, which may serve to update the Fuel Offering Generator system. Also, various accounts may require custom database tables depending upon the environments and the types of clients the Fuel Offering Generator system may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2219*a-e*. The Fuel Offering Generator system may be configured to keep track of various settings, inputs, and parameters via database controllers.

The Fuel Offering Generator system database may communicate to and/or with other components in a component collection, including itself, and/or facilities of the like. Most frequently, the Fuel Offering Generator system database communicates with the Fuel Offering Generator system component, other program components, and/or the like. The database may contain, retain, and provide information regarding other nodes and data.

The Fuel Offering Generator

The Fuel Offering Generator component 2235 is a stored program component that is executed by a CPU. The Fuel Offering Generator component affects accessing, obtaining and the provision of information, services, transactions, and/or the like across various communications networks. As such, the Fuel Offering Generator component enables one to access, calculate, engage, exchange, generate, identify, instruct, match, process, search, serve, store, and/or facilitate transactions to promote fuel offerings to customers. In one embodiment, the Fuel Offering Generator component incorporates any and/or all combinations of the aspects of the Fuel Offering Generator that were discussed in the previous figures.

The Fuel Offering Generator system component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the Fuel Offering Generator system server employs a cryptographic server to encrypt and decrypt communications. The Fuel Offering Generator system component may communicate to and/or with other components in a component collection, including itself, and/or facilities of the like. Most frequently, the Fuel Offering Generator system component communicates with the Fuel Offering Generator system database, operating systems, other program components, and/or the like. The Fuel Offering Generator system may contain, communicate, generate, obtain, and/or provide program component, system, user, and/or data communications, requests, and/or responses.

Distributed Fuel Offering Generator system

The structure and/or operation of any of the Fuel Offering Generator system node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Fuel Offering Generator system controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method to provide commodity offerings, comprising:
    setting at least one commodity offering term for a commodity offering;
    setting at least one commodity offering exercise restriction for a commodity offering;
    determining by a processor at least one commodity offering pricing value based on the at least one commodity offering term and at least one commodity offering pricing model for the commodity offering;
    providing the commodity offering, including two or more associations, based on the commodity offering pricing value, between strike prices and premiums, for selection by a customer;
    receiving a customer selection of at least one of the two or more associations; and
    providing payment for some portion of a commodity purchase for an exercised commodity offering based on the customer selection subject to the at least one commodity offering exercise restriction, wherein the strike price of the commodity offering is less than a geographically averaged commodity price.

2. The method of claim 1, wherein the commodity is a fuel.

3. The method of claim 2, wherein the fuel is a vehicle fuel.

4. The method of claim 2, wherein the fuel is a heating fuel.

5. The method of claim 1, wherein the geographically averaged commodity price is a regional average commodity price.

6. The method of claim 1, wherein the geographically averaged commodity price is a national average commodity price.

7. The method of claim 1, wherein the geographically averaged commodity price is a multi-national average commodity price.

8. The method of claim 1, wherein the premiums are determined based at least in part on the strike prices.

9. The method of claim 1, wherein the strike prices are determined based at least in part on the premiums.

10. The method of claim 1, wherein the commodity offering pricing model includes at least one commodity market variable.

11. The method of claim 10, wherein the at least one commodity market variable is a geographically averaged commodity price.

12. The method of claim 10, wherein the at least one commodity market variable includes any of: wholesale gasoline over-the-counter options market data, wholesale gasoline over-the-counter forward market and futures market data, retail gasoline spot prices, wholesale gasoline implied volatilities, wholesale gasoline forward curve, spread of retail spot price over wholesale spot price.

13. The method of claim 1, further comprising:
    determining whether the two or more associations are satisfactory.

14. The method of claim 13, wherein the determining whether the two or more associations are satisfactory, further, comprises querying a market information database for information to be used as a factor in determining whether said associations are satisfactory.

15. The method of claim 13, wherein the determining whether the two or more associations are satisfactory, further, comprises querying a customer marketing database for information to be used as a factor in determining whether said associations are satisfactory.

16. The method of claim 15, wherein the commodity offering term is adjusted based on the determination of whether the associations are association is satisfactory.

17. The method of claim 15, wherein the commodity offering pricing model is adjusted based on the determination of whether the associations are satisfactory.

18. The method of claim 13, wherein the determining whether the two or more associations are satisfactory, further, comprises querying a historical usage database.

19. The method of claim 18, wherein the commodity offering term is adjusted based on the determination of whether the associations are satisfactory.

20. The method of claim 18, wherein the commodity offering pricing model is adjusted based on the determination of whether the associations are satisfactory.

21. The method of claim 1, wherein commodity offering term parameters may include any of: strike price, premium, tenor, constraints, restrictions, commodity type.

22. The method of claim 1, wherein the commodity offering pricing model comprises a commodity volatility model described by a stochastic differential equation.

23. The method of claim 22, wherein the commodity volatility model described by a stochastic differential equation is manifested in a Monte Carlo simulation.

24. The method of claim 22, wherein the commodity volatility model described by a stochastic differential equation is manifested in a grid-pricing scheme.

25. The method of claim 22, wherein the commodity volatility model described by a stochastic differential equation is manifested in at least one analytic formula.

26. The method of claim 1, wherein the setting at least one commodity offering term is based on a customer specification.

27. The method of claim 26, wherein the customer specification includes a customer specified strike price.

28. The method of claim 26, wherein the customer specification includes a customer specified premium.

29. The method of claim 26, wherein the customer specification includes a tenor.

30. The method of claim 26, wherein the customer specification includes a commodity type.

31. The method of claim 1, wherein the customer selection comprises customer payment of a selected premium and a selected strike price for a specified commodity quantity.

32. The method of claim 31, wherein payment for some portion of a commodity purchase for an exercised commodity offering comprises a payment to a commodity retailer for the commodity purchase on which the commodity offering has been exercised.

33. The method of claim 1, wherein the customer selection comprises customer payment of a specified premium but not a strike price for a specified commodity quantity.

34. The method of claim 33, wherein payment for some portion of a commodity purchase for an exercised commodity offering comprises a payment to a customer based on a commodity purchase size and a difference between the strike price and the geographically averaged price.

35. The method of claim 1, wherein the payment for some portion of a commodity purchase for an exercised commodity offering is limited to a total commodity quantity specified by the commodity offering terms.

36. The method of claim 1, further comprising:
recording customer selection of commodity offerings in a customer selection database; and
executing a hedge based on entries in the customer selection database.

37. The method of claim 36, further comprising:
aggregating entries in the customer selection database into at least one similarity class prior to executing the hedge; and
executing the hedge based on similarity classes.

38. The method of claim 37, wherein aggregating entries is based on commodity offering terms.

39. The method of claim 37, wherein aggregating entries is based on commodity offering pricing.

40. The method of claim 37, wherein aggregating entries is based on customer characteristics.

41. The method of claim 37, wherein aggregating entries is based on risk considerations.

42. The method of claim 36, wherein the hedge includes the purchase of at least one forward contract.

43. The method of claim 1, wherein the commodity pricing model is configured to output at least one price sensitivity value.

44. The method of claim 43, further comprising:
executing a hedge based at least in part on the at least one price sensitivity value.

45. The method of claim 1, wherein the at least one commodity offering exercise restriction comprises:
a periodic usage restriction having a specified period.

46. The method of claim 45, wherein the specified period is a month.

47. The method of claim 45, wherein the specified period is a year.

48. The method of claim 45, wherein the specified period is a fiscal quarter.

49. The method of claim 45, wherein the periodic usage restriction having a specified period is configured to allow a different usage restriction for each period.

50. The method of claim 45, wherein the periodic usage restriction monotonically decreases with passage of each successive period.

51. The method of claim 45, wherein the periodic usage restriction monotonically increases with passage of each successive period.

52. The method of claim 45, wherein the periodic usage restriction comprises commodity offering term specifying a maximum allowed usage per period.

53. The method of claim 45, wherein the periodic usage restriction comprises the commodity offering term specifying a fixed allowed usage per period.

54. The method of claim 1, wherein the at least one commodity offering usage restriction comprises:
a maximum redemption restriction.

55. The method of claim 54, wherein the maximum redemption restriction comprises a commodity offering term specifying a limiting commodity price, wherein exercising the commodity offering on a quantity of commodity with a retail price that is higher than the limiting commodity price yields a redemption based on the limiting commodity price and not the retail price.

56. The method of claim 54, wherein the maximum redemption restriction comprises a commodity offering term specifying a limiting payout, wherein exercising the commodity offering on a quantity of commodity with a retail price higher than the sum of the strike price and the limiting payout yields a redemption based on the limiting payout and not the difference of the retail price and strike price.

57. A processor-implemented system to provide commodity offerings, comprising:
a memory;
a processor disposed in communication with said memory, and configured to execute a plurality of processing instructions stored in the memory to:
set at least one commodity offering term for a commodity offering;
set at least one commodity offering exercise restriction for a commodity offering;
determine at least one commodity offering pricing value based on the at least one commodity offering term and at least one commodity offering pricing model for the commodity offering;
provide the commodity offering, including two or more associations, based on the commodity offering pricing value, between strike prices and premiums, for selection by a customer;
receive a customer selection of at least one of the two or more associations; and
provide payment for some portion of a commodity purchase for an exercised commodity offering based on the customer selection subject to the at least one commodity offering exercise restriction, wherein the strike price of the commodity offering is less than a geographically averaged commodity price.

58. A non-transitory processor-readable medium having processor-executable program instructions residing thereon, wherein the processor-executable program instructions are executable by the processor to:
set at least one commodity offering term for a commodity offering;
set at least one commodity offering exercise restriction for a commodity offering;
determine at least one commodity offering pricing value based on the at least one commodity offering term and at least one commodity offering pricing model for the commodity offering;
provide the commodity offering, including two or more associations based on the commodity offering pricing value, between strike prices and premiums, for selection by a customer;
receive a customer selection of at least one of the two or more associations; and
provide payment for some portion of a commodity purchase for an exercised commodity offering based on the customer selection subject to the at least one commodity offering exercise restriction, wherein the strike price of the commodity offering is less than a geographically averaged commodity price.

59. An apparatus to provide commodity offerings, comprising:

a memory;

a processor disposed in communication with said memory, and configured to execute a plurality of processing instructions stored in the memory:

set at least one commodity offering term for a commodity offering;

set at least one commodity offering exercise restriction for a commodity offering;

determine at least one commodity offering pricing value based on the at least one commodity offering term and at least one commodity offering pricing model for the commodity offering;

provide the commodity offering, including two or more associations, based on the commodity offering pricing value, between strike prices and premiums, for selection by a customer;

receive a customer selection of at least one of the two or more associations; and provide payment for some portion of a commodity purchase for an exercised commodity offering based on the customer selection subject to the at least one commodity offering exercise restriction, wherein the strike price of the commodity offering is less than a geographically averaged commodity price.

60. The method of claim 1, wherein providing the commodity offering includes:

providing the two or more associations between the strike prices and the premiums for selectable display to the customer, wherein the customer selection is received from the selectable display.

* * * * *

UNITED STATES PATENT AND TRADEMARK OFFICE
CERTIFICATE OF CORRECTION

PATENT NO. : 8,311,928 B2  
APPLICATION NO. : 11/733191  
DATED : November 13, 2012  
INVENTOR(S) : Michael Kirch et al.

Page 1 of 1

It is certified that error appears in the above-identified patent and that said Letters Patent is hereby corrected as shown below:

In the Claims

Column 42, claim 16, line 29, delete "association is"

Column 43, claim 42, line 39, after "includes" delete "the"

Signed and Sealed this  
Eleventh Day of November, 2014

Michelle K. Lee  
*Deputy Director of the United States Patent and Trademark Office*